(12) United States Patent
Nishiguchi

(10) Patent No.: US 7,378,459 B2
(45) Date of Patent: May 27, 2008

(54) PIGMENT-DISPERSED INK-JET INK, INK SET, INK TANK, RECORDING UNIT, INK-JET RECORDING APPARATUS, INK-JET RECORDING PROCESS AND PRODUCTION PROCESS OF PIGMENT-DISPERSED INK-JET INK

(75) Inventor: Kenji Nishiguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 645 days.

(21) Appl. No.: 10/957,611

(22) Filed: Oct. 5, 2004

(65) Prior Publication Data
US 2005/0075418 A1 Apr. 7, 2005

(30) Foreign Application Priority Data
Oct. 7, 2003 (JP) ............... 2003-347808

(51) Int. Cl.
*C09D 11/00* (2006.01)
(52) U.S. Cl. ...................... 523/160; 523/161
(58) Field of Classification Search .......... 523/160, 523/161
See application file for complete search history.

(56) References Cited

U.S. PATENT DOCUMENTS

| | | | |
|---|---|---|---|
| 5,382,283 A | 1/1995 | Yui et al. | 107/22 R |
| 5,529,617 A | 6/1996 | Yamashita et al. | 106/20 R |
| 5,604,276 A * | 2/1997 | Suga | 524/100 |
| 6,005,023 A * | 12/1999 | Anton et al. | 523/161 |
| 6,245,832 B1 | 6/2001 | Suzuki et al. | 523/160 |
| 6,599,353 B2 * | 7/2003 | Spencer et al. | 106/31.6 |
| 2004/0212667 A1 * | 10/2004 | Nishiguchi | 347/96 |
| 2005/0282928 A1 * | 12/2005 | Lin et al. | 523/160 |

FOREIGN PATENT DOCUMENTS

| | | |
|---|---|---|
| EP | 0 534 634 A1 | 3/1993 |
| EP | 0 622 429 A2 | 11/1994 |
| EP | 1 193 301 A1 | 4/2002 |
| EP | 1 270 624 A1 | 1/2003 |
| EP | 1 445 291 A2 | 8/2004 |
| JP | 5-25413 A | 2/1993 |
| JP | 5-140496 A | 6/1993 |
| JP | 5-202328 A | 8/1993 |
| JP | 5-263029 A | 10/1993 |
| JP | 5-331395 A | 12/1993 |
| JP | 7-207202 A | 8/1995 |

* cited by examiner

*Primary Examiner*—Edward J. Cain
(74) *Attorney, Agent, or Firm*—Fitzpatrick, Cella, Harper & Scinto

(57) ABSTRACT

Disclosed herein is a pigment-dispersed ink-jet ink comprising a pigment and a resinous dispersing agent, wherein the resinous dispersing agent is a vinyl copolymer having an acid value of 50 mg KOH/g or higher and a solubility of at most 3% by mass in an alkaline solution containing KOH in an amount 1.5 times as much as the acid value, and the viscosity characteristic of the ink as measured by means of a viscoelastometer satisfies the following relationship:

$1.1 \leq$ (Viscosity of an ink as measured under conditions of 20° C. and a shear rate of 0.5 sec$^{-1}$)/ (Viscosity of an ink as measured under conditions of 20° C. and a shear rate of 100 sec$^{-1}$) $\leq 2.0$.

15 Claims, 3 Drawing Sheets

PIGMENT-DISPERSED INK-JET INK, INK SET, INK TANK, RECORDING UNIT, INK-JET RECORDING APPARATUS, INK-JET RECORDING PROCESS AND PRODUCTION PROCESS OF PIGMENT-DISPERSED INK-JET INK

BACKGROUND OF THE INVENTION

1. Field of the Invention

The present invention relates to a pigment-dispersed ink-jet ink having high ejection stability from an ink-jet nozzle, ink sets that use this pigment-dispersed ink and can provide high-quality color images, an ink tank, a recording unit, an ink-jet recording apparatus, an ink-jet recording process, and a production process of the pigment-dispersed ink-jet ink.

2. Description of the Background Art

In inks used in an ink-jet recording system, it is currently a subject of various investigations to use pigments excellent in weather-fastness as coloring materials for inks for the purpose of improving the weather-fastness of recorded articles formed on recording media using such inks. Since a pigment is not dissolved in an ink-jet ink, but is in a dispersed state in a liquid medium, however, the ejection velocity of a pigment-dispersed ink ejected from a nozzle is unstable, and the ejection stability of the ink has been extremely low, as demonstrated by the fact that the ink is sometimes not ejected from the nozzle. As a result, the problem has occurred that the ink does not exactly impact at an intended position on a recording medium, and so an image to be formed is disordered.

On the other hand, it is investigated to improve the ejection stability by adding a certain kind of nonionic surfactant into an ink (see, for example, Japanese Patent Application Laid-Open Nos. H05-140496 and H07-207202).

As an ink-jet ink, that having high penetrability into a recording medium as its physical property is generally used in view of the fixing speed thereof and bleeding between inks of different colors. Therefore, a coloring material penetrates into the interior of a recording medium when an image is formed on plain paper or the like, and so it is impossible to fix a sufficient amount of the coloring material on to the surface of the recording medium. As a result, it has been difficult to provide a recorded article having good coloring ability.

In order to achieve sufficient coloring, various proposals have been made about the fact that a reactive liquid reactive to a coloring material in an ink is used in combination with the ink upon formation of an image, and the reactive liquid is brought into contact with the coloring material upon the formation of the image, thereby depositing and aggregating the coloring material in the ink to conduct solid-liquid separation into a liquid medium and the coloring material so as to increase the amount of the coloring material fixed on to the surface of a recording medium (see, for example, Japanese Patent Application Laid-Open No. H05-202328). Although addition of that kind of nonionic surfactant into a pigment-dispersed ink has been made for the purpose of improving the ejection stability of the ink as described above, however, the effect thereof varies according to the kind of pigment and a dispersing agent, and there have been only a few surfactants capable of reliably retaining sufficient ejection stability. Further, the aggregating reaction of a pigment by virtue of the reactive liquid described above may have been impeded in some cases depending on the kind of the nonionic surfactant added. As described above, it has been extremely difficult to reconcile an improvement in the ejection stability from an ink-jet nozzle with improvement of the coloring properties of a recorded article when a pigment-dispersed ink is used for the purpose of providing a recorded article having good weather-fastness.

A proposal has been made that when a water-soluble resin is used as a resinous dispersing agent for an ink-jet ink using a pigment dispersion (hereinafter referred to merely as "pigment dispersion") in which a pigment is dispersed in a liquid medium with the resinous dispersing agent, a water-soluble resin having higher solubility in water is preferably used for the purpose of reliably retaining the ejection stability (see, for example, Japanese Patent Application Laid-Open No. H05-263029). When a resin having high solubility in water is used as the resinous dispersing agent, however, the adsorptivity of the resinous dispersing agent to the pigment is weak, and so it has been difficult to reliably retain dispersion stability and storage stability.

In order to improve the water fastness and fixing ability of a recorded article formed on a recording medium, a proposal that a resin having a solubility in water of at most 2% by mass at 20° C. is added in addition to the resinous dispersing agent (Japanese Patent Application Laid-Open No. H05-331395), and a proposal that particles of an insoluble resin are added (Japanese Patent Application Laid-Open No. H05-25413) have been made. However, a resin having a high solubility in water is used as the resinous dispersing agent even in these proposals. Therefore, another problem that the ejection stability of the resulting ink is deteriorated when the resin having a low solubility in water is separately added in addition to the resinous dispersing agent, and so the impact accuracy of the ink on a recording medium is lowered, and the resulting recorded article is disordered has been involved.

Fine particles dispersed in a solution like pigments in an ink are held in a dispersed state by an action between van der Waals attraction (force) acting between the fine particles, and electrostatic repulsion generated by static charges on the surfaces of the fine particles and repulsion by steric hindrance of a resin and a surfactant adsorbed on the surfaces of the fine particles. With respect to the van der Waals attraction, a Hamaker constant is determined, and the van der Waals attraction may be calculated out from the constant for the fine particles and the particle diameter thereof. On the other hand, the degree of the effect of the electrostatic repulsion may be determined by measuring the zeta potential of the fine particles. A great number of proposals have heretofore been made on pigment-dispersed ink-jet inks improved in the dispersion stability of a pigment contained therein and the ejection stability of the inks by defining the electrostatic repulsion, i.e., the zeta potential. With respect to the effect of the repulsion by steric hindrance of the resin and surfactant adsorbed on the surfaces of the fine particles, however, a method for evaluating it has not been established, and a sufficient investigation has not been made about the influence of a repulsion factor by this steric hindrance on pigment-dispersed ink-jet inks.

SUMMARY OF THE INVENTION

It is accordingly an object of the present invention to provide a pigment-dispersed ink-jet ink and an ink set that can provide a recorded article exhibiting good weather-fastness on a recording medium, reliably retain good ejection stability and storage stability, prevent the recorded article from being disordered by lowering of impact accuracy, a reactive ink set that can provide a recorded article reliably retaining sufficient coloring properties on a recording medium, an ink tank, a recording unit, an ink-jet recording apparatus, an ink-jet recording process, and a production process of the pigment-dispersed ink-jet ink.

The above object can be achieved by the present invention described below.

In an aspect of the present invention, there is thus provided a pigment-dispersed ink-jet ink comprising a pigment and a resinous dispersing agent, wherein the resinous dispersing agent is a vinyl copolymer having an acid value of 50 mg KOH/g or higher and a solubility of at most 3% by mass in an alkaline solution containing KOH in an amount 1.5 times as much as the acid value, and the viscosity characteristic of the ink as measured by means of a viscoelastometer satisfies the following relationship:

$1.1 \leq$ (Viscosity of an ink as measured under conditions of 20° C. and a shear rate of 0.5 sec$^{-1}$)/(Viscosity of an ink as measured under conditions of 20° C. and a shear rate of 100 sec$^{-1}$) $\leq 2.0$.

In another aspect of the present invention, there is provided an ink set comprising a plurality of inks, wherein at least one of the inks is the ink described above.

In a further aspect of the present invention, there is provided an ink tank comprising an ink-containing part, which contains the pigment-dispersed ink-jet ink described above.

In a still further aspect of the present invention, there is provided a recording unit comprising the pigment-dispersed ink-jet ink described above and an ink-jet recording head for ejecting the ink.

In a yet still further aspect of the present invention, there is provided an ink-jet recording apparatus comprising the pigment-dispersed ink-jet ink described above and an ink-jet recording head for ejecting the ink.

In a yet still further aspect of the present invention, there is provided an ink-jet recording process comprising the step of ejecting the pigment-dispersed ink-jet ink on a recording medium by an ink-jet method.

In a yet still further aspect of the present invention, there is provided a process for producing the pigment-dispersed ink-jet ink described above, which comprises the step of adding a pigment into a hydrophilic medium containing an alkaline solution, which contains KOH in an amount 1 to 1.5 times as much as the acid value of a resinous dispersing agent contained in the ink, and the resinous dispersing agent.

DETAILED DESCRIPTION OF THE PREFERRED EMBODIMENTS

Figure 1:
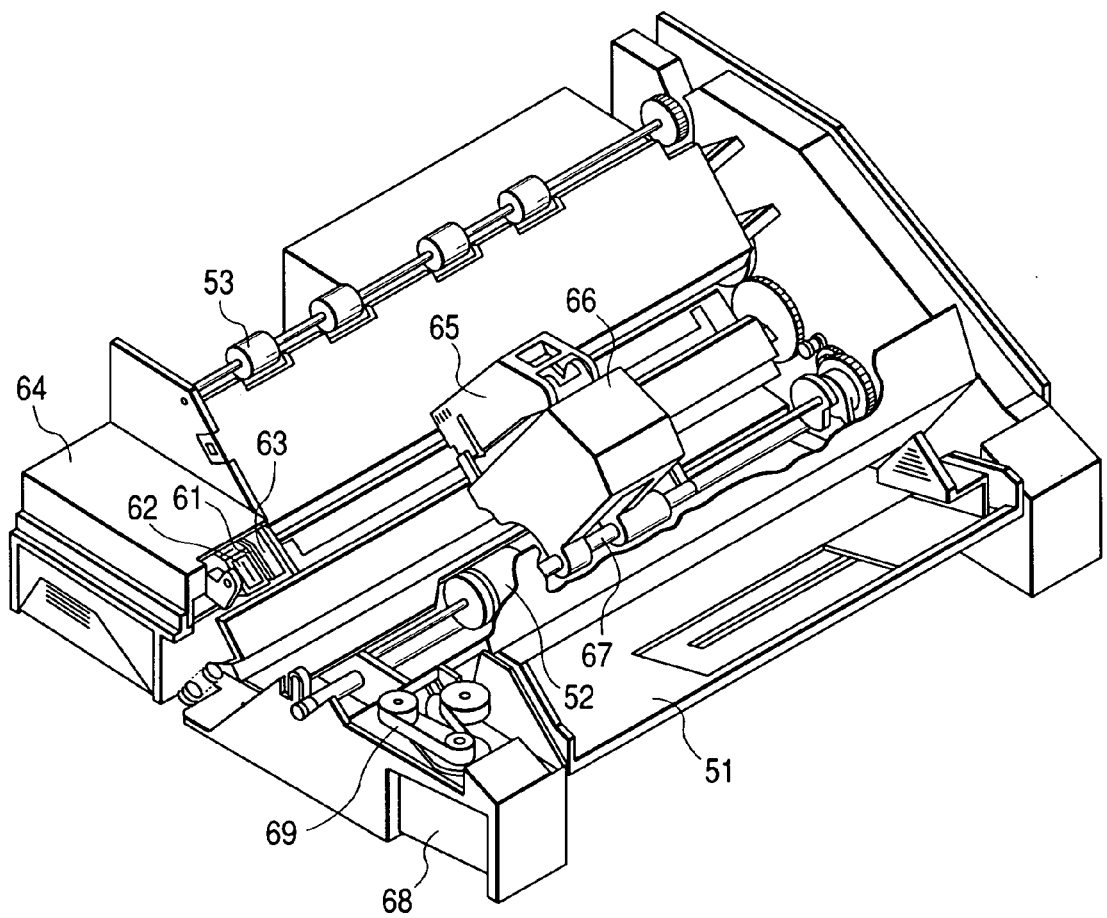
FIG. 1 is a perspective view illustrating an exemplary ink-jet recording apparatus.

The present invention will hereinafter be described in more detail with preferred embodiments.

The pigment-dispersed ink-jet ink according to the present invention comprises a pigment and a resinous dispersing agent. The resinous dispersing agent is a vinyl copolymer having an acid value of 50 mg KOH/g or higher and a solubility of at most 3% by mass in an alkaline solution containing KOH in an amount 1.5 times as much as the acid value. The viscosity characteristic of the ink as measured by means of a viscoelastometer satisfies the following relationship:

$1.1 \leq$ (Viscosity of an ink as measured under conditions of 20° C. and a shear rate of 0.5 sec$^{-1}$)/(Viscosity of an ink as measured under conditions of 20° C. and a shear rate of 100 sec$^{-1}$) $\leq 2.0$.

First, the evaluation of the viscosity characteristic of the pigment-dispersed ink-jet ink (hereinafter also referred to as "ink" or "pigment-dispersed ink") according to the present invention is described.

The term "viscosity characteristic" as used in the present invention means a change in the viscosity of the ink as measured by changing the shear rate, and the viscosity characteristic is determined by means of a Brookfield type viscometer or viscoelastometer (rheometer).

As described above, fine particles dispersed in a solution like pigments in an ink are held in a dispersed state by an action between van der Waals forces on between the fine particles, and electrostatic repulsion generated by static charges on the surfaces of the fine particles and repulsion by steric hindrance of a resin and a surfactant adsorbed on the surfaces of the fine particles. The present inventors have inferred that the repulsion by the steric hindrance acts as greater repulsion as the thickness of a layer of the resin and surfactant adsorbed on the surfaces of the fine particles becomes greater. When the thickness of the adsorbed layer is great, a volume concentration including the adsorbed layer becomes high even when the particle diameter is the same, and the volume concentration of the pigment is the same, so that the viscosity of the dispersion becomes high as derived from Einstein's viscosity equation $[\eta = \eta_0 \times (1+2.5\phi)]$ wherein $\eta$ is the viscosity of the dispersion, $\eta_0$ is the viscosity of a dispersion medium, and $\phi$ is the volume concentration of the pigment.

However, the adsorbed layer is considered to be formed by the molecules of the resin and surfactant and molecules of water hydrated on these substances, and the structure thereof is considered to be dynamically weak. Accordingly, the molecular orientation of the adsorbed layer is easy to be broken by the flow by rotation under measuring conditions that a rotational speed upon viscosity measurement is high, namely, the shear rate is high (100 sec$^{-1}$ in the present invention; hereinafter also referred to as 100 s$^{-1}$), and so the adsorbed layer becomes hard to contribute as a volume increment of the pigment particles, and the volume increment is hard to be measured as viscosity increase. When the rotational speed is made low, namely, the shear rate is lowered (0.5 sec$^{-1}$ in the present invention; hereinafter also referred to as 0.5 s$^{-1}$) on the other hand, the molecular orientation of the adsorbed layer is hard to be broken. It is therefore considered that the viscosity increase by the volume increment of the fine particles can be measured. Accordingly, that having a higher viscosity ratio between a high shear rate and a low shear rate can be evaluated as having a greater effect by the steric hindrance.

Thus, the present inventors have carried out an investigation on the basis of this consideration. As a result, it has been found that when the viscosity ratio between the high shear rate and the low shear rate satisfies the following relationship, the repulsion effect by the steric hindrance of the resin and surfactant adsorbed on the surfaces of the pigment particles can improve ink-jet characteristics, particularly, ejection stability, thus leading to completion of the present invention.

$$1.1 \leq (\text{Viscosity of an ink as measured under conditions of 20° C. and a shear rate of 0.5 sec}^{-1})/(\text{Viscosity of an ink as measured under conditions of 20° C. and a shear rate of 100 sec}^{-1}) \leq 2.0.$$

The resinous dispersing agent used in the present invention for dispersing a pigment in a liquid medium will now be described.

Such a resinous dispersing agent is a vinyl copolymer having an acid value of 50 mg KOH/g or higher and a solubility of at most 3% by mass in an alkaline solution containing KOH in an amount 1.5 times as much as the acid value.

When the acid value falls within the above range, the solubility of such a copolymer is enhanced, and excellent dispersibility is achieved. As a result, the ejection stability and storage stability of the resulting ink are improved. In addition, when the vinyl copolymer is used in the so-called reactive system that a substance (for example, a polyvalent metal ion) having a polarity opposite to the polarity of the dispersing agent is used to aggregate the pigment, thereby achieving high coloring ability, which will be described in detail subsequently, it is also possible to exhibit very good reactivity because many reactive points are present. In the present invention, the acid value is preferably at least 200 mg KOH/g because the solubility or dispersion stability in the alkaline solution is more enhanced. In the present invention, the acid value is preferably at most 300 mg KOH/g. If the acid value exceeds 300 mg KOH/g, the viscosity of the resulting pigment dispersion becomes too high to tend to deteriorate ejection, and the affinity of the pigment dispersion for water becomes too high to tend to lower the water fastness of the resulting print.

The solubility in the alkaline solution is controlled to the above range, thereby preventing solubility from becoming too high. As a result, very good ejection stability and storage stability can be achieved. In addition, even when such a vinyl copolymer is used in the above-described reactive system, very good reactivity can be exhibited.

In the present invention, as described above, the constitution prescribed by the present invention synergistically acts, whereby the marked effects of the present invention can be achieved.

In the present invention, the acid value can be measured by a publicly known method, for example, a method prescribed in JIS K 5601. In the present invention, the definition that "the solubility of the resinous dispersing agent is at most 3% by mass" is judged by turbidity when the resinous dispersing agent is added to an alkaline solution containing KOH in an amount almost 1.5 times as much as the acid value of the resinous dispersing agent so as to give a concentration of at most 3% by mass, and the resulting solution is observed visually. The turbidity of the resulting solution means that the solubility of the resinous dispersing agent is at most 3% by mass.

The weight average molecular weight of the resinous dispersing agent used in the present invention is preferably 1,000 to 30,000, particularly preferably 3,000 to 15,000. In the present invention, the weight average molecular weight is measured by gel permeation chromatography (GPC), and the value thereof is a value in terms of polystyrene. All weight average molecular weights described below in the present invention are values in terms of polystyrene as measured by GPC.

Examples of such a resin include copolymers obtained by copolymerizing at least one monomer selected from a group of vinyl monomers having a carboxyl group, such as acrylic acid, methacrylic acid, maleic acid (maleic anhydride), itaconic acid and fumaric acid with such another monomer as described below.

In the present invention, another monomer used for forming the vinyl copolymer used as the resinous dispersing agent may be any monomer so far as it is copolymerizable with the vinyl monomer. Examples thereof include vinyl monomers having an aromatic functional group, such as styrene, α-methylstyrene, benzyl acrylate, benzyl methacrylate, vinylnaphthalene, 4-vinylbenzoic acid, vinyl benzoate and N-vinylcarbazole, (meth)acrylic esters such as methyl (meth)acrylate, ethyl(meth)acrylate, butyl (meth)acrylate and cyclohexyl(meth)acrylate, acrylamide monomers such as (meth)acrylamide, N-methylol (meth)acrylamide and N,N-dimethylaminopropyl(meth)acrylamide, vinyl monomers such as N-vinylacetamide, N-vinylformamide and vinyl acetate, and ethylene-oxide- or propylene-oxide-modified compounds thereof. A copolymer obtained by using a vinyl monomer having an aromatic functional group among these is preferably used as the resinous dispersing agent.

The resinous dispersing agent used in the present invention is particularly preferably a resinous dispersing agent described below. More specifically, a graft polymer having a hydrophobic main chain and a hydrophilic side chain, in which the weight average molecular weight of the side chain is 300 to 2,000, and the weight average molecular weight of the graft polymer itself and the weight average molecular weight of the side chain satisfy the following relationship, is particularly preferred.

$$4 \leq (\text{Weight average molecular weight of the graft polymer itself})/(\text{Weight average molecular weight of the side chain of the graft polymer}) \leq 20.$$

In the present invention, such a graft polymer is preferably a vinyl copolymer.

The weight average molecular weight of the side chain of the graft polymer is more preferably 300 to 1,500. As described above, the weight average molecular weight of the graft polymer itself is preferably 1,000 to 30,000, with 3,000 to 15,000 being particularly preferred.

In the present invention, the polydispersity of the resinous dispersing agent is preferably at most 3.5, particularly preferably from 1 to 3. In the present invention, the molecular weight of the dispersing agent tends to affect improvement in the ejection stability and coloring ability of the resulting pigment-dispersed ink. Therefore, the use of a polymer having high polydispersity, i.e., a polymer having various molecular weights makes it difficult to achieve the effects of the present invention. In the present invention, the polydispersity can be determined by (weight average molecular weight of a polymer)/(number average molecular weight of a polymer). As with the weight average molecular weight, the number average molecular weight can be determined by GPC. All number average molecular weights described below in the present invention are values in terms of polystyrene as measured by GPC.

Such a graft polymer preferably has an ionic group in its structure. Examples of the ionic group include carboxyl, sulfo, sulfino and phosphino groups.

It is necessary to select at least one monomer from the group of monomers having a hydrophobic functional group as the monomer making up the hydrophobic main chain. Examples of the monomers having a hydrophobic functional group include vinyl monomers having an aromatic functional group, such as styrene, α-methylstyrene, benzyl (meth)acrylate, vinylnaphthalene, 4-vinylbenzoic acid, vinyl benzoate and N-vinylcarbazole, (meth)acrylic esters such as methyl(meth)acrylate, ethyl(meth)acrylate, butyl (meth) acrylate and cyclohexyl(meth)acrylate, vinyl monomers such as vinyl acetate, and ethylene-oxide- or propylene-oxide-modified compounds thereof.

It is necessary to form the hydrophilic moiety by selecting, as a hydrophilic monomer forming the hydrophilic side chain, at least one monomer from the group of hydrophilic monomers having a carboxyl group, such as acrylic acid, methacrylic acid, maleic acid (maleic anhydride), itaconic acid and fumaric acid, monomers having a hydroxyl group, such as hydroxyalkyl esters of (meth)acrylic acid, and mono(meth)acrylic esters of polyhydric alcohols such as ethylene glycol, (meth)acrylic esters of ethylene oxide and propylene oxide, acrylamide monomers such as (meth) acrylamide, N-methylol (meth)acrylamide and N,N-dimethylaminopropyl-(meth)acrylamide, N-vinylacetamide, and N-vinylformamide.

The monomer forming the main chain may also be made up from a hydrophilic monomer so far as no detrimental influence is thereby imposed on the characteristics of hydrophobicity. When the proportion of the hydrophobic monomer making up the main chain is low, however, the resulting graft polymer is difficult to be adsorbed on pigment particles, and so dispersibility is not fully achieved, and dispersion stability and ejection stability tend to be lowered. Accordingly, the proportion of the hydrophobic monomer making up the main chain is at least 60% by mass based on the mass of all the monomers forming the main chain.

The monomer forming the side chain may also be made up from a hydrophobic monomer so far as no detrimental influence is thereby imposed on the characteristics of hydrophilicity. When the proportion of the hydrophilic monomer making up the side chain is low, however, the solubility of the resulting graft polymer in a hydrophilic medium is lowered, and so the dispersed state of the pigment in the hydrophilic medium is liable to be unstable, and the resulting ink tends to impair its ejection stability upon ejection from an ink-jet head. Accordingly, the proportion of the hydrophilic monomer making up the side chain is at least 60% by mass based on the mass of all the monomers forming the side chain.

In order to impart reactivity to a reactive liquid, which will be described subsequently, it is preferable to include at least 30% by mass of a monomer having a carboxyl group in all the monomers forming the side chain.

Such a carboxyl-group-containing monomer is preferably acrylic acid. When acrylic acid is used, the range of the weight average molecular weight of the side chain, in which excellent ejection stability is achieved, can be more widened compared with other carboxyl-group-containing monomers.

The graft polymer used in the present invention may be synthesized by any publicly known method such as a graft-from method that a branch monomer is polymerized from a backbone polymer, a graft-onto method that a branch polymer is bonded to a backbone polymer, or a graft-through method (macromonomer method) that a backbone monomer is copolymerized with a branch polymer. Among these, the macromonomer method is a method most effective and high in general-purpose properties in that the backbone polymer is already known, and the polymer is easily designed.

In the present invention, the resinous dispersing agent is preferably contained in a range of from 0.1 to 15% by mass based on the total mass of the pigment-dispersed ink. A plurality of resinous dispersing agents may be used in combination as needed, or different kinds of resinous dispersing agents may be separately used according to a pigment used. An optimum resinous dispersing agent is selected according to the pigment used, whereby the ejection stability from an ink-jet nozzle and dispersion stability of the resulting ink can remarkably be improved.

In the present invention, other water-soluble resins than the resinous dispersing agents prescribed in the present invention may be used either singly or in any combination thereof so far as no detrimental influence is thereby imposed on the marked effects of the present invention. Examples of usable water-soluble resins include (meth)acrylic resins, polyamide resins, polyester resins, polypeptide, cellulose and modified products thereof, polyvinyl alcohol, and polyolefins. These water-soluble resins may preferably be added in a proportion almost equivalent to or lower than the amount of the resinous dispersing agent according to the present invention into the coloring pigment-dispersed ink.

The colorant of the pigment-dispersed ink according to the present invention is a pigment. The pigment may be any pigment of an inorganic pigment and an organic pigment. The content of the pigment in the ink is preferably 1 to 20% by mass, particularly preferably 2 to 12% by mass based on the total mass of the ink.

As specific examples of pigments usable in the present invention, the following pigments may be mentioned.

As an example of a black pigment, carbon black may be mentioned. As such carbon black, preferably used are those produced in accordance with the furnace process or channel process and having such properties that the oil absorption is 40 to 200 ml/100 g as determined by using DBP, the primary particle diameter is 11 to 40 mµ (nm), the specific surface area is 50 to 400 m$^2$/g as determined in accordance with the BET method, the volatile matter is 0.5 to 10%, and the pH is 2 to 10.

Examples of commercially-available carbon black having such properties as described above include No. 2300, No. 900, No. 950, MCF 88, No. 33, No. 40, No. 45, No. 52, MA 7, MA 8 and No. 2200B (all, products of Mitsubishi Chemical Industries Limited), RAVEN 1255 (product of Columbian Carbon Co.), REGAL 400R, REGAL 330R, REGAL 660R and MOGUL L (all, products of Cabot Company), and Color Black FW1, Color Black FW285, Color Black FW18, Color Black S170, Color Black S160, Printex 35, HIBLACK 900, HIBLACK 890 and Printex U (all, products of Degussa). All these commercially available carbon black products may preferable be used in the present invention.

Examples of yellow pigments include C.I. Pigment Yellow 1, C.I. Pigment Yellow 2, C.I. Pigment Yellow 3, C.I. Pigment Yellow 13, C.I. Pigment Yellow 16, C.I. Pigment Yellow 74, C.I. Pigment Yellow 83, C.I. Pigment Yellow 110 and C.I. Pigment Yellow 128.

Examples of magenta pigments include C.I. Pigment Red 5, C.I. Pigment Red 7, C.I. Pigment Red 12, C.I. Pigment Red 48(Ca), C.I. Pigment Red 48(Mn), C.I. Pigment Red 57(Ca), C.I. Pigment Red 112 and C.I. Pigment Red 122.

Examples of cyan pigments include C.I. Pigment Blue 1, C.I. Pigment Blue 2, C.I. Pigment Blue 3, C.I. Pigment Blue 15:3, C.I. Pigment Blue 15:4, C.I. Pigment Blue 15:6, C.I. Pigment Blue 16, C.I. Pigment Blue 22, C.I. Vat Blue 4 and C.I. Vat Blue 6.

However, the pigments are not limited to these pigments in the present invention. It goes without saying that those newly prepared, such as self-dispersing pigments, may also be used in addition to the pigments mentioned above.

The pigment-dispersed ink-jet ink according to the present invention contains a liquid medium in addition to the above-described components. A hydrophilic medium is preferred as the liquid medium. As the hydrophilic medium, is preferred a mixed solvent of water and a water-soluble organic solvent. As the water, it is preferable to use ion-exchanged water (deionized water) instead of tap water containing various ions.

As examples of the water-soluble organic solvent used in combination with water, may be mentioned alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and keto-alcohols such as acetone and diacetone alcohol; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; 1,2,6-hexanetriol; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; N-methyl-2-pyrrolidone; 2-pyrrolidone; and 1,3-dimethyl-2-imidazolidinone. Among a number of these water-soluble organic solvents, polyhydric alcohols such as diethylene glycol and lower alkyl ethers of polyhydric alcohols, such as triethylene glycol monomethyl (or monoethyl) ether are preferred.

The content of such a water-soluble organic solvent as described above in the ink is preferably 3 to 50% by mass, particularly preferably 3 to 40% by mass based on the total mass of the ink, while the content of water used is preferably 10 to 90% by mass, particularly preferably 30 to 80% by mass based on the total mass of the ink.

In the pigment-dispersed ink according to the present invention, it is desirable that the ink be adjusted to neutrality or alkalinity as a whole because electrostatic repulsion acts between pigment particles, and so the dispersion stability of the pigment can be enhanced, and the ink can be provided as an ink that is very excellent in long-term storability. In this case, however, it is more desirable that the pH be adjusted to a range of from 7 to 10 because too high an alkalinity causes various parts used in an ink-jet recording apparatus to be corroded.

Besides the above components, for example, a surfactant, antifoaming agent, preservative and the like may be suitably added to the ink according to the present invention, as needed, to provide the ink with desired physical properties. In particular, a surfactant functioning as a penetration-accelerating agent is necessarily added in a proper amount for fulfilling a role of penetrating liquid components of the ink into a recording medium. For example, the amount added is preferably 0.05 to 10% by mass, more preferably 0.5 to 5% by mass. As an anionic surfactant, may preferably be used any of generally used surfactants, for example, those of carboxylic acid salt type, sulfuric acid salt type, sulfonic acid salt type and phosphoric acid ester type.

The production process of the ink composed of such components as described above will hereinafter be described. A pigment is first added to a dispersion medium composed of a hydrophilic medium containing at least a vinyl copolymer used as a resinous dispersing agent and water in combination, and the mixture is stirred. A dispersion treatment is then conducted in accordance with a dispersing means described below, and as needed, a classification treatment for removing coarse particles, such as centrifugation, is carried out, as needed, to obtain a desired pigment dispersion. A size and such additive components as mentioned above are then suitably selected and added-to the dispersion. The resultant mixture is stirred to prepare an ink according to the present invention.

Such a vinyl copolymer as described above, which is used as the resinous dispersing agent, is not completely dissolved in an alkaline solution, and a base may be added for the purpose of enhancing affinity for the dispersion medium. Examples of the base used in this case include organic amines such as monoethanolamine, diethanolamine, triethanolamine, aminomethylpropanol and N,N-dimethylethanolamine, ammonia, and inorganic bases such as potassium hydroxide and sodium hydroxide. In particular, the pigment is preferably added into a hydrophilic medium containing an alkaline solution, which contains KOH in an amount 1 to 1.5 times as much as the acid value of the resinous dispersing agent, and the resinous dispersing agent.

In the production process described above, a hydrophilic medium dissolving the vinyl copolymer as the resinous dispersing agent used for dispersing the pigment in the ink therein may be added to the dispersion medium. The hydrophilic medium usable in this case may be any medium so far as it can dissolve the vinyl copolymer therein. For example, a hydrophilic medium, such as a lower alcohol such as methanol, ethanol, 1-propanol or 2-propanol, a glycol such as diethylene glycol or dipropylene glycol, a glycol ether such as ethylene glycol monomethyl ether, ethylene glycol monoethyl ether, diethylene glycol monomethyl ether, diethylene glycol monoethyl ether, propylene glycol monomethyl ether, propylene glycol monoethyl ether, dipropylene glycol monomethyl ether or dipropylene glycol monoethyl ether, a ketone such as methyl ethyl ketone, or a cyclic ether such as tetrahydrofuran may be preferably used. These hydrophilic media may be mixed with a solvent containing ion-exchanged water or the like in advance, and the resinous dispersing agent may be then dissolved therein, or the resinous dispersing agent may be dissolved in these hydrophilic media in advance, and the resultant solution may be then added with a solvent containing ion-exchanged water or the like.

When the hydrophilic medium is intended to be removed for enhancing the dispersion stability of the ink produced, it is only necessary to remove the hydrophilic medium by acidifying the pH of the dispersion after the dispersion treatment to aggregate solids including the pigment, or conducting solid-liquid separation by subjecting the dispersion to centrifugation, and disperse the solids again in a desired aqueous solution to provide an ink. In the production process of the pigment-containing ink, it is effective to conduct premixing for at least 30 minutes before the hydrophilic medium containing the pigment is stirred to subject it to the dispersion treatment. This premixing is preferred because it can serve to improve the wettability of the surface of the pigment and facilitate adsorption of the dispersing agent on the surface of the pigment.

Any dispersing machine routinely used may be employed as a dispersing machine used in the dispersion treatment of the pigment in the dispersion medium. Examples thereof include ball mills, roll mills and sand mills. Of these mills, a high-speed sand mill may preferably be used. Examples of the high-speed sand mill include Super Mill, Sand Grinder, Beads Mill, Agitator Mill, Grain Mill, Dyno Mill, Pearl Mill and Coball Mill (all, trade names).

In the case where the pigment-dispersed ink according to the present invention is used in an ink-jet recording process, a pigment having an optimum particle size distribution is used from the viewpoint of, for example, resistance to clogging. As methods for obtaining a pigment having a desired particle size distribution, may be mentioned techniques in which the size of a grinding medium in a dispersing machine is made smaller, in which the packing rate of a grinding medium is made higher, in which the processing time is made longer, in which discharging rate is made lower, in which classification is conducted by filter, centrifugal separator or the like after grinding, and in which these methods are combined.

The reactive ink set according to the present invention will now be described. The reactive ink set according to the present invention is a reactive ink set comprising at least one pigment-dispersed ink-jet ink and a reactive liquid containing a reactant reactive to the pigment-dispersed ink, wherein the pigment-dispersed ink is the above-described pigment-dispersed ink-jet ink according to the present invention or an ink set comprising this ink. As described above, the pigment-dispersed ink-jet ink according to the present invention is very preferably used in the reactive system because the reactivity of the resinous dispersing agent used is very high, so that far excellent coloring ability can be achieved.

The reactive liquid used in the present invention will now be described. A polyvalent metal salt is most preferably used as a reactant, which is contained in a reactive liquid used in the present invention and reactive to the ink. The polyvalent metal salt is formed by a divalent or still higher polyvalent metal ion and an anion bonded to the polyvalent metal ion. Examples of the polyvalent metal ion include divalent metal ions such as $Ca^{2+}$, $Cu^{2+}$, $Ni^{2+}$, $Mg^{2+}$ and $Zn^{2+}$, and trivalent metal ions such as $Fe^{3+}$ and $Al^{3+}$. Examples of the anion include $Cl^-$, $NO_3^-$ and $SO_4^{2-}$. In order to react in a moment to form an aggregated film, the total charge concentration of the polyvalent metal ion in the reactive liquid is preferably at least twice as much as the total charge concentration of an ion having a polarity opposite to the metal ion in the ink.

The reactive liquid used in the present invention is used by dissolving or dispersing the reactive liquid in a hydrophilic medium. Examples of the water-soluble organic solvent making up the reactive liquid used in the present invention include amides such as dimethylformamide and dimethylacetamide; ketones such as acetone; ethers such as tetrahydrofuran and dioxane; polyalkylene glycols such as polyethylene glycol and polypropylene glycol; alkylene glycols such as ethylene glycol, propylene glycol, butylene glycol, triethylene glycol, thiodiglycol, hexylene glycol and diethylene glycol; 1,2,6-hexanetriol; lower alkyl ethers of polyhydric alcohols, such as ethylene glycol methyl ether, diethylene glycol monomethyl ether and triethylene glycol monomethyl ether; monohydric alcohols such as ethanol, isopropyl alcohol, n-butyl alcohol and isobutyl alcohol; and besides, glycerol, N-methyl-2-pyrrolidone, 1,3-dimethylimidazolidinone, triethanolamine, sulfolane, and dimethyl sulfoxide. No particular limitation is imposed on the content of the water-soluble organic solvent in the reactive liquid used in the present invention. However, it is preferably 5 to 60% by mass, particularly preferably 5 to 40% by mass based on the total mass of the reactive liquid. At this time, when the surface tension of the reactive liquid is adjusted so as to become higher than that of the ink, the reactive liquid is prevented from penetrating into a recording medium before the ink impacts on the recording medium. Such a reactive liquid is particularly preferred because it effectively reacts with the ink.

Besides the above components, additives such as viscosity modifiers, pH adjustors, preservatives and antioxidants may be suitably incorporated into the reactive liquid used in the present invention as needed. However, it is necessary to give attention to selection of the surfactant functioning as a penetration-accelerating agent and the added amount thereof in that the penetrability of the reactive liquid into the recording medium is controlled. The reactive liquid used in the present invention is more preferably colorless, but may be tinted so far as the color tone of each color ink is not changed when it is mixed with the ink on a recording medium. With respect to preferable physical property ranges of such a reactive liquid as described above, the viscosity is preferably controlled to a range of from 1 to 30 cP (mPa·s) around 25° C.

As a preferable recording apparatus for conducting recording by using the inks according to the present invention, may be mentioned an apparatus in which thermal or mechanical energy corresponding to recording signals is applied to an ink within a chamber of a recording head having ink-containing parts, which respectively contain these inks, and ink droplets are generated by the energy.

FIG. 1 illustrates an example of an ink-jet recording apparatus in which this head has been incorporated. In FIG. 1, reference numeral 61 designates a blade serving as a wiping member, one end of which is a stationary end held by a blade-holding member to form a cantilever. The blade 61 is provided at a position adjacent to a region in which a recording head operates, and in the embodiment illustrated in FIG. 1, is held in such a form that it protrudes into the course through which the recording head is moved. Reference numeral 62 indicates a cap which is provided at a home position adjacent to the blade 61, and is so constructed that it moves in a direction perpendicular to a direction in which the recording head is moved, and comes into contact with the face of ejection openings to cap it. Reference numeral 63 in FIG. 1 denotes an ink absorbing member provided adjoiningly to the blade 61 and, similar to the blade 61, held in such a form that it protrudes into the course through which the recording head is moved.

The above-described blade 61, cap 62 and ink absorbing member 63 constitute an ejection-recovery portion 64, where the blade 61 and ink absorbing member 63 remove water, dust, dirt and/or the like from the face of the ink-ejecting openings. Reference numeral 65 designates the recording head having an ejection-energy-generating means and serving to eject an ink onto a recording medium set in an opposing relation to the ejection opening face provided with the ejection openings to conduct recording. Reference numeral 66 indicates a carriage on which the recording head 65 is mounted so that the recording head 65 can be moved. The carriage 66 is slidably interlocked with a guide shaft 67 and is connected at its part to a belt 69 driven by a motor 68. Thus, the carriage 66 can be moved along the guide shaft 67 and hence, the recording head 65 can be moved from a recording region to a region adjacent thereto.

Reference numerals 51 and 52 denote a feeding part from which the recording medium is inserted, and feed rollers driven by a motor (not illustrated), respectively. With such a construction, the recording medium is fed to the position opposite to the ejection opening face of the recording head, and discharged from a discharge section provided with discharge rollers 53 with the progress of recording.

In the above construction, the cap 62 in the ejection-recovery portion 64 is receded from the path of motion of the recording head 65 when the recording head 65 is returned to its home position after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65.

When the recording head 65 is moved from its home position to the position at which recording is started, the cap 62 and the blade 61 are at the same positions as the positions for the wiping as described above. As a result, the ejection opening face of the recording head 65 is also wiped at the time of this movement. The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 2:
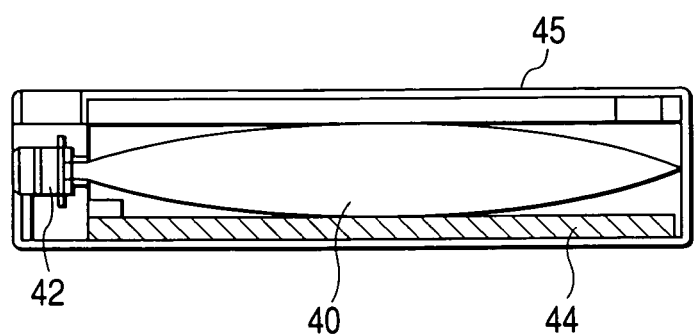
FIG. 2 is a longitudinal cross-sectional view of an ink cartridge.

FIG. 2 is a cross-sectional view illustrating an exemplary ink cartridge 45 in which an ink to be fed to a head through a member for feeding the ink, for example, a tube is contained. Here, reference numeral 40 designates an ink container part containing the ink to be fed, as exemplified by a bag for ink. One end thereof is provided with a stopper 42 made of rubber. A needle (not illustrated) may be inserted into this stopper 42 so that the ink in the bag 40 for ink can be fed to the head. Reference numeral 44 indicates an ink absorbing member for receiving a waste ink.

Figure 3:
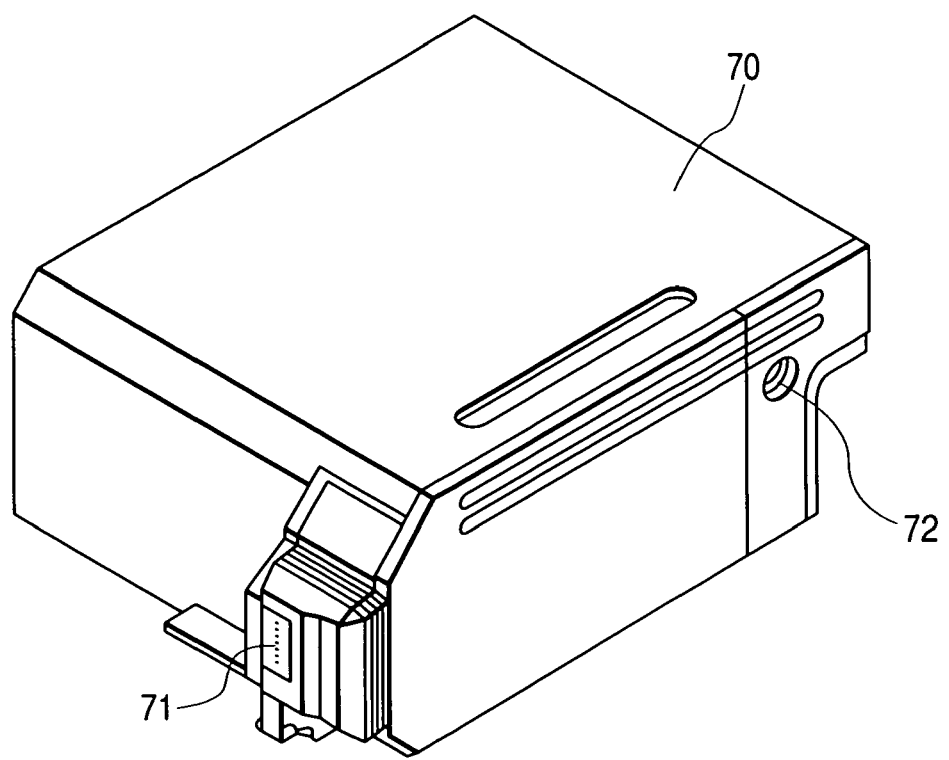
FIG. 3 is a perspective view of a recording unit.

The ink-jet recording apparatus used in the present invention is not limited to the apparatus as described above in which the head and the ink cartridge are separately provided. Therefore, a device in which these members are integrally formed as shown in FIG. 3 can also be preferably used. In FIG. 3, reference numeral 70 designates a recording unit, in the interior of which an ink container part containing an ink, for example, an ink absorbing member, is contained. The recording unit 70 is so constructed that the ink in such an ink absorbing member is ejected in the form of ink droplets through a head 71 having a plurality of orifices. Reference numeral 72 indicates an air passage for communicating the interior of the recording unit with the atmosphere. This recording unit 70 is used in place of the recording head 65 shown in FIG. 1, and is detachably installed on the carriage 66.

Figure 4:
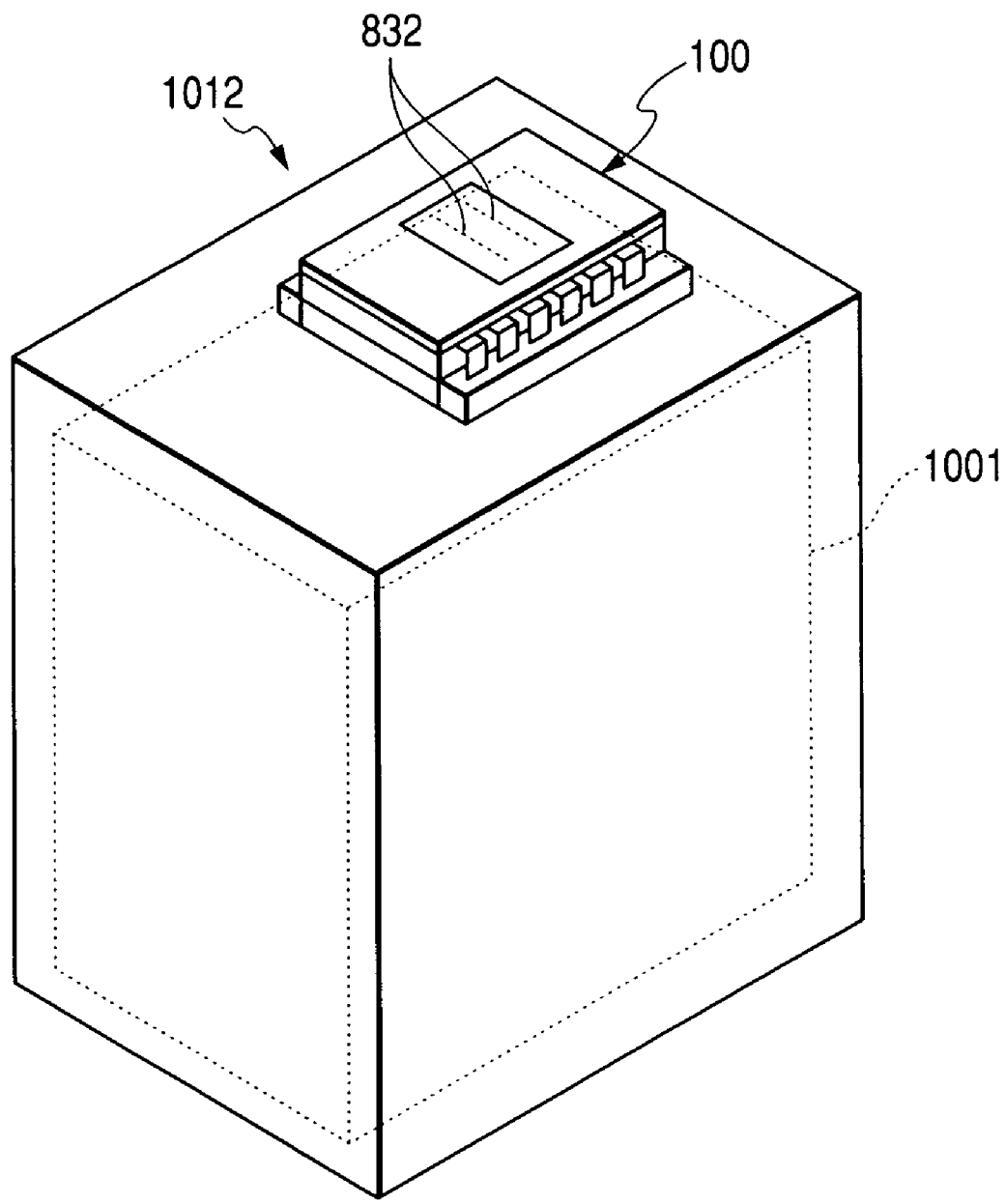
FIG. 4 is a schematic perspective view illustrating an exemplary ink-jet cartridge equipped with a liquid-ejecting head.

FIG. 4 illustrates an exemplary ink-jet cartridge capable of being mounted on the above-described ink-jet recording apparatus. The cartridge 1012 in this embodiment is of a serial type, and its principal part is constructed by an ink-jet recording head 100 and a liquid tank 1001 for containing a liquid such as an ink. In the ink-jet recording head 100, a great number of ejection openings 832 for ejecting the liquid are formed, and the liquid such as an ink is directed to a common liquid chamber in the liquid-ejecting head 100 through a liquid feed passage (not illustrated) from the liquid tank 1001. The cartridge 1012 shown in FIG. 4 is so constructed that the ink-jet recording head 100 and the liquid tank 1001 are integrally formed, and the liquid can be supplied to the interior of the liquid tank 1001 as needed. However, a structure that the liquid tank 1001 is replaceably joined to this liquid-ejecting head 100 may also be adopted.

The present invention will hereinafter be described specifically by the following Examples and Comparative Examples. However, the present invention is not limited only to these examples. Incidentally, all designations of "part" or "parts" and "%" as will be used in the following examples mean part or parts by mass and % by mass unless expressly noted.

EXAMPLE 1

(Synthesis of Macromonomer M1)

Two parts of 3-mercaptopropionic acid and 80 parts of t-butyl acrylate were added dropwise to 500 parts of 1-methoxy-2-propanol at a polymerization temperature of 75° C. over 3 hours under a nitrogen atmosphere. At this time, azobisisobutyronitrile was used as an initiator. Ten parts of glycidyl methacrylate, 0.01 parts of hydroquinone and 0.05 parts of N,N-dimethyldodecylamine were then added to the resultant solution to conduct a reaction at 90° C. for 5 hours. The reaction product thus obtained was developed in 1,000 parts of hexane to remove unreacted compounds by precipitation purification. After the product purified was dissolved in 500 parts of a 10% ethanol solution of KOH to subject the t-butyl group to a hydrolyzing treatment, the hydrolyzed product was developed again in 1,000 parts of hexane to remove impurities by precipitation purification, thereby obtaining Macromonomer M1 of acrylic acid. The weight average molecular weight of Macromonomer M1 was 630.

(Synthesis of Graft Polymer G1)

Macromonomer M1 in an amount of 30 parts in terms of solids and 70 parts of styrene were used to conduct a reaction at 75° C. for 2 hours by using azobisisobutyronitrile as an initiator in 500 parts of 1-methoxy-2-propanol under a nitrogen atmosphere. The reaction product thus obtained was developed in 1,000 parts of hexane to remove unreacted compounds by precipitation purification and dried under reduced pressure to obtain Graft Polymer G1. This Graft Polymer G1 as a dispersing agent had a weight average molecular weight of 5,800, a number average molecular weight of 2,800, a polydispersity of 2.1 and an acid value of 222 mg KOH/g. One part of Graft Polymer G1 obtained above was mixed with 33 parts of an aqueous solution of KOH with 0.34 parts of KOH dissolved therein (the resultant mixture contained 2.9% of the polymer in an alkaline solution containing KOH in an amount 1.5 times as much as the acid value of the polymer), and the mixture was stirred for 24 hours. Since the KOH solution was in a turbid state even after the stirring, and thus Graft Polymer G1 was not dissolved, the solubility of the polymer was at most 3%.

(Preparation of Pigment Dispersion P1)

| | |
|---|---|
| Graft Polymer G1 | 15 parts |
| Propylene glycol monomethyl ether | 50 parts |
| Ion-exchanged water | 200 parts |
| Potassium hydroxide | 1 part. |

After the above components were mixed to completely dissolve the resin, 30 parts of Pigment Blue 15:3 were added to premix the components for 30 minutes. Thereafter, the resultant premix was subjected to a dispersing treatment under the following conditions.

Dispersing machine: sand grinder (manufactured by Igarashi Kikai K. K.)

Grinding medium: zirconium beads (diameter: 1 mm)

Packing rate of grinding medium: 75% (by volume)

Grinding time: 3 hours.

Solids were separated from the solvents by precipitation with acid, and a 1% aqueous solution of KOH was added to the solids so as to give a solid concentration of 15% to prepare Pigment Dispersion P1.

(Preparation of Pigment-Dispersed Ink C1)

| | |
|---|---|
| Pigment Dispersion P1 | 30 parts |
| Glycerol | 5 parts |
| Diethylene glycol | 5 parts |
| Isopropyl alcohol | 5 parts |
| Acetylenol EH (trade name, product of Kawaken Fine Chemicals Co., Ltd.) | 1 part |
| Ion-exchanged water | 54 parts. |

The above components were mixed to prepare Pigment-dispersed Ink C1.

(Viscosity Measurement of Ink and Evaluation of Viscosity Ratio)

The viscosity characteristics of Pigment-dispersed Ink C1 were determined by means of a viscoelastometer MCR300 (trade name, manufactured by Paar Physica Co.). As a measuring system, a co-axial double cylinder, W gap DG42/T200/XL/Q1 was used, and the measuring system was kept at 20° C. by a thermostat. The rotational speed was varied to change a shear rate, thereby determining the viscosity characteristics of Pigment-dispersed Ink C1. The measured results of the viscosity of Pigment-dispersed Ink C1 under conditions of shear rates of $0.5\ s^{-1}$ and $100\ s^{-1}$ were used to calculate out a viscosity ratio on the basis of the following equation. As a result, it was 1.28.

Viscosity ratio=(Viscosity of ink as measured under conditions of 20° C. and $0.5\ s^{-1}$)/(Viscosity of ink as measured under conditions of 20° C. and $100\ s^{-1}$)

(Analytical Method of Molecular Weight and Composition of Graft Polymer)

The analytical method of the molecular weight and composition of the resinous dispersing agent contained in Pigment-dispersed Ink C1 will be described.

Solids obtained by subjecting Pigment-dispersed Ink C1 to a precipitation treatment with hydrochloric acid were suspended in tetrahydrofuran to extract the polymer, and centrifugation was conducted for 1 hour at 40,000 rpm to precipitate the pigment, thereby collecting a supernatant, in which the polymer was dissolved. In order to additionally collect the polymer, a process wherein the precipitate is suspended again in tetrahydrofuran, and centrifugation is conducted, was repeated several times. After a part of the polymer solution thus obtained was precipitated and purified with hexane, the weight average molecular weight (Mw) of the polymer was measured. As a result, it was 5,800. An NMR spectrum revealed that the composition of the polymer was composed of styrene and acrylic acid. Since the peak intensities of styrene and acrylic acid varied in NMR spectra using various solvents, this polymer was found not to be a random copolymer.

After the tetrahydrofuran solution of the polymer obtained previously was subjected to a hydrolyzing treatment with a 20% aqueous solution of potassium hydroxide and neutralized with hydrochloric acid, 2 components were purified and isolated by column chromatography. The weights (Wx and Wy) of the thus-obtained Polymer x and Polymer y were measured. As a result, Wx was 0.32 g, and Wy was 0.22 g. The compositions of the polymers were analyzed from the respective NMR spectra of Polymer x and Polymer y. As a result, it was found that Polymer x was polystyrene, and Polymer y was polyacrylic acid. The weight average molecular weights (Mwx and Mwy) of the polystyrene and polyacrylic acid were 3,200 and 630, respectively. The molar ratio (Mx/Mwx:My/Mwy) of the polystyrene to the polyacrylic acid, which was determined by the weight average molecular weights (Mwx and Mwy) and the weights (Wx and Wy), was 1:3.5. Since the molar ratio between the two components was lower than 1:2, it was found that this polymer was not a block polymer, but a graft polymer, in which the polystyrene formed a main chain, the polyacrylic acid formed a side chain, and the number of branches in the polymer was 3.5 on the average.

It was thus found that the resinous dispersing agent in Pigment-dispersed Ink C1 was a graft polymer, in which the polystyrene formed a main chain, the polyacrylic acid formed a side chain, the weight average molecular weight Mwg of the side chain was 630, the weight average molecular weight Mwa of the whole polymer was 5,800, and a ratio Mwa/Mwg of the weight average molecular weight of the whole polymer to the weight average molecular weight of the side chain was 9.1. This was equivalent to that of Graft Polymer G1.

(Evaluation of Ejection Stability of Ink)

The evaluation of ejection stability of the ink was made in the following manner. Pigment-dispersed Ink C1 was charged into an ink cartridge of a commercially available ink-jet printer BJS-600 (trade name, manufactured by Canon Inc.) to print English characters and numerals on 100 sheets of commercially available plain paper Super-white Paper (trade name, manufactured by Canon Inc.). Printing disorder of the prints thus obtained was visually observed to evaluate the ink as to the ejection stability in accordance with the following standard. The results are shown in Table 1.

AA: No disorder was observed on characters;
A: Disorder was sometimes observed on characters;
B: Disorder was observed on characters;
C: Disorder was markedly observed on characters.

(Evaluation of Storage Stability of Ink)

The evaluation of the storage stability was made in the following manner. As a storage test, Pigment-dispersed Ink C1 was stored for 1,000 hours in a thermostat controlled to 60° C. The average particle diameters of pigment particles dispersed in the ink before and after the storage test were measured by means of FPAR-1000 (trade name, manufactured by Otsuka Electronics Co., Ltd.) on the basis of a dynamic light scattering method. A rate (%) of change in the particle diameter caused in the course of the storage was determined from the following equation using the measured values thus obtained. The results are shown in Table 1.

Rate (%) of change=[(Particle diameter after storage)−(Particle diameter before storage)/(Particle diameter before storage)]×100.

The ink was evaluated as to the storage stability by means of the degree of the thus-obtained rate (%) of change in the particle diameter in accordance with the following standard.

A: The rate of change in particle diameter was lower than 10%;
B: The rate of change in particle diameter was not lower than 10%, but lower than 30%;
C: The rate of change in particle diameter was not lower than 30%.

(Evaluation of Coloring Ability of Ink)

The following components were mixed to prepare Reactive Liquid S. This liquid was charged into an ink tank, and the tank was installed together with Pigment-dispersed Ink C1 in a commercially available ink-jet printer BJF 890 (trade name, manufactured by Canon Inc.).

| | |
|---|---|
| Magnesium nitrate hexahydrate | 10 parts |
| Glycerol | 5 parts |
| Diethylene glycol | 5 parts |
| Isopropyl alcohol | 5 parts |
| Acetylenol EH (trade name, product of Kawaken Fine Chemicals Co., Ltd.) | 0.2 parts |
| Ion-exchanged water | 74.8 parts. |

After Reactive Liquid S was ejected on PB paper (product of Canon Inc.) that is plain paper, Pigment-dispersed Ink C1 was ejected so as to come into contact with Reactive Liquid S on the paper to produce a solid print, and a* and b* values of chromaticity in CIE standard L*a*b* color space were measured by means of a reflective densitometer RD-191 (trade name, manufactured by Gretag Macbeth) to determine the chroma $C^* = (a^{*2} + b^{*2})^{1/2}$ The results are shown in Table 2.

EXAMPLE 2

(Synthesis of Macromonomer M2)

Twenty parts of an α-methylstyrene dimer and 80 parts of acrylic acid were added dropwise to 500 parts of 1-methoxy-2-propanol at a polymerization temperature of 75° C. over 3 hours under a nitrogen atmosphere. At this time, azobisisobutyronitrile was used as an initiator. After the drop addition, the resultant mixture was kept at 75° C. for 2 hours. The reaction product thus obtained was developed in 1,000 parts of hexane to remove unreacted compounds by precipitation purification and dried under reduced pressure to obtain Macromonomer M2. The weight average molecular weight of Macromonomer M2 was 320.

(Synthesis of Graft Polymer G2)

30 parts of Macromonomer M2 in terms of solids, 40 parts of styrene, 20 parts of n-butyl acrylate and 10 parts of ethylene glycol monoacrylate were used to obtain Graft Polymer G2 in the same manner as in EXAMPLE 1. This Graft Polymer G2 as a dispersing agent had a weight average molecular weight of 1,800, a number average molecular weight of 1,300, a polydispersity of 1.4 and an acid value of 218 mg KOH/g. One part of Graft Polymer G2 obtained above was mixed with 33 parts of an aqueous solution of KOH with 0.33 parts of KOH dissolved therein (to prepare a 2.9% solution of the polymer), and the solution was stirred for 24 hours. Since the KOH solution was in a turbid state even after the stirring, and thus Graft Polymer G2 was not dissolved, the solubility of the polymer was at most 3%.

With respect to the graft polymer thus obtained, the viscosity characteristics, the weight average molecular weight Mwg of the side chain, the weight average molecular weight Mwa of the whole polymer and the ratio Mwa/Mwg of the weight average molecular weight of the whole polymer to the weight average molecular weight of the side chain were measured in the same manner as in EXAMPLE 1. As a result, the following results were obtained.

| |
|---|
| Viscosity characteristics: 1.13 |
| Mwg: 320 |
| Mwa: 1,800 |
| Mwa/Mwg: 5.6. |

A pigment dispersion and a pigment-dispersed ink were prepared in the same manner as in EXAMPLE 1 except that Graft Polymer G2 was used, and the resultant ink was evaluated. The results are shown in Table 1.

EXAMPLES 3 to 5 AND COMPARATIVE EXAMPLES 1 AND 2

Macromonomers M3 to M7 different in molecular weight from one another were synthesized by using the synthetic process of the macromonomer as described in EXAMPLE 2 and suitably adjusting the ratio of the solvent to the monomers, thereby synthesizing Graft Polymers G3 to G7 as dispersing agents, which were different in the weight average molecular weight (Mwa) of the whole polymer and the weight average molecular weight (Mwg) of the side chain from one another as shown in the following Table.

With respect to each of the graft polymers thus obtained, the acid value, the solubility, the viscosity characteristics, the weight average molecular weight Mwg of the side chain, the weight average molecular weight Mwa of the whole polymer, the number average molecular weight Mna of the whole polymer, the ratio Mwa/Mwg of the weight average molecular weight of the whole polymer to the weight average molecular weight of the side chain and the polydispersity Mwa/Mna were measured in the same manner as in EXAMPLE 1. As a result, the results shown in the following Table were obtained. In the following Table, those whose solubility was at most 3% are indicated by "O", and those whose solubility exceeded 3% are indicated by "X".

| | Dispersing agent | Mwg | Mwa | Mna | Mwa/Mwg | Mwa/Mna | Acid value (mg KOH/g) | Solubility | Viscosity characteristics |
|---|---|---|---|---|---|---|---|---|---|
| EX. 3 | G3 | 600 | 3200 | 2300 | 5.8 | 1.4 | 220 | O | 1.26 |
| EX. 4 | G4 | 1000 | 6000 | 3300 | 6.0 | 1.8 | 225 | O | 1.38 |
| EX. 5 | G5 | 1600 | 9000 | 3900 | 5.6 | 2.3 | 238 | O | 1.52 |
| COMP. Ex. 1 | G6 | 150 | 1000 | 660 | 6.7 | 1.5 | 212 | X | 1.04 |
| COMP. Ex. 2 | G7 | 2100 | 12000 | 3300 | 5.7 | 3.6 | 242 | O | 2.25 |

Pigment dispersions and pigment-dispersed inks were prepared in the same manner as in EXAMPLE 1 except that the respective graft polymers were used, and the resultant inks were evaluated. The results are shown in Table 1.

EXAMPLES 6 TO 9 AND COMPARATIVE EXAMPLES 3 AND 4

Macromonomers M8 to M13 different in molecular weight from one another were synthesized in the same manner as in the synthetic process of the macromonomer as described in EXAMPLE 1 except that t-butyl methacrylate was used in place of t-butyl acrylate, and the ratio of the solvent to the monomers was suitably adjusted. Graft Polymers G8 to G13 as dispersing agents, which were different in the weight average molecular weight (Mwa) of the whole polymer and the weight average molecular weight (Mwg) of the side chain from one another as shown in the following Table were then synthesized in the same manner as in EXAMPLE 1 except that 30 parts of each of Macromonomers M8 to M13 in terms of solids, 50 parts of benzyl methacrylate and 20 parts of ethyl methacrylate were used.

With respect to each of the graft polymers thus obtained, the acid value, the solubility, the viscosity characteristics, the weight average molecular weight Mwg of the side chain, the weight average molecular weight Mwa of the whole polymer, the number average molecular weight Mna of the whole polymer, the ratio Mwa/Mwg of the weight average molecular weight of the whole polymer to the weight average molecular weight of the side chain and the polydispersity Mwa/Mna were measured in the same manner as in EXAMPLE 1. As a result, the results shown in the following Table were obtained. In the following Table, those whose solubility was at most 3% are indicated by "O", and those whose solubility exceeded 3% are indicated by "X".

EXAMPLES 10 TO 13 AND COMPARATIVE EXAMPLE 5

Macromonomers M14 to M18 different in molecular weight from one another were synthesized in the same manner as in the synthetic process of the macromonomer as described in EXAMPLE 2 except that 60 parts of acrylic acid and 20 parts of ethylene glycol monoacrylate were used in place of 80 parts of acrylic acid, and the ratio of the solvent to the total amount of the monomers was suitably adjusted. Graft Polymers G14 to G18 as dispersing agents, which were different in the weight average molecular weight (Mwa) of the whole polymer and the weight average molecular weight (Mwg) of the side chain from one another as shown in the following Table were then synthesized in the same manner as in EXAMPLE 1 except that 40 parts of each of Macromonomers M14 to M18 in terms of solids, 40 parts of benzyl acrylate and 20 parts of isobutyl methacrylate were used.

With respect to each of the graft polymers thus obtained, the acid value, the solubility, the viscosity characteristics, the weight average molecular weight Mwg of the side chain, the weight average molecular weight Mwa of the whole polymer, the number average molecular weight Mna of the whole polymer, the ratio Mwa/Mwg of the weight average molecular weight of the whole polymer to the weight average molecular weight of the side chain and the polydispersity Mwa/Mna were measured in the same manner as

|  | Dispersing agent | Mwg | Mwa | Mna | Mwa/Mwg | Mwa/Mna | Acid value (mg KOH/g) | Solubility | Viscosity characteristics |
|---|---|---|---|---|---|---|---|---|---|
| EX. 6 | G8 | 330 | 1800 | 1200 | 5.5 | 1.5 | 184 | O | 1.12 |
| EX. 7 | G9 | 600 | 3300 | 1800 | 5.5 | 1.8 | 189 | O | 1.24 |
| EX. 8 | G10 | 980 | 5600 | 2800 | 5.7 | 2.0 | 193 | O | 1.39 |
| EX. 9 | G11 | 1500 | 8900 | 3000 | 5.9 | 3.0 | 195 | O | 1.48 |
| COMP. Ex. 3 | G12 | 160 | 1000 | 600 | 6.3 | 1.7 | 181 | X | 1.02 |
| COMP. Ex. 4 | G13 | 2100 | 12000 | 3200 | 5.7 | 3.8 | 199 | O | 2.30 |

Pigment dispersions and pigment-dispersed inks were prepared in the same manner as in EXAMPLE 1 except that the respective graft polymers were used, and the resultant inks were evaluated. The results are shown in Table 1.

in EXAMPLE 1. As a result, the results shown in the following Table were obtained. In the following Table, those whose solubility was at most 3% are indicated by "O", and those whose solubility exceeded 3% are indicated by "X".

|  | Dispersing agent | Mwg | Mwa | Mna | Mwa/Mwg | Mwa/Mna | Acid value (mg KOH/g) | Solubility | Viscosity characteristics |
|---|---|---|---|---|---|---|---|---|---|
| EX. 10 | G14 | 1000 | 6200 | 3100 | 6.2 | 2.0 | 192 | O | 1.40 |
| EX. 11 | G15 | 780 | 7700 | 3600 | 9.9 | 2.1 | 197 | O | 1.28 |
| EX. 12 | G16 | 620 | 11000 | 3000 | 17.7 | 3.7 | 216 | O | 1.27 |
| COMP. Ex. 5 | G17 | 1200 | 4000 | 2200 | 3.3 | 1.8 | 186 | O | 2.10 |
| EX. 13 | G18 | 620 | 13800 | 3900 | 22.5 | 3.5 | 213 | O | 1.21 |

Pigment dispersions and pigment-dispersed inks were prepared in the same manner as in EXAMPLE 1 except that the respective graft polymers were used, and the resultant inks were evaluated. The results are shown in Table 1.

EXAMPLES 14 AND 15

Macromonomers M19 and M20 were synthesized in the same manner as in the synthetic process of the macromonomer as described in EXAMPLE 2 except that acrylic acid (AA) and 2-hydroxyethyl acrylate (HEA) were used in place of 80 parts of acrylic acid, and the mass ratio AA:HEA was controlled to 40:40 (EXAMPLE 14) and 20:60 (EXAMPLE 15). Graft Polymers G19 and G20 as dispersing agents, which were different in the acid value from each other as shown in the following Table were then synthesized by conducting polymerization at the same ratio as in EXAMPLE 2 except that Macromonomers M19 (EXAMPLE 14) and M20 (EXAMPLE 15) were respectively used.

With respect to each of the graft polymers thus obtained, the acid value, the solubility, the viscosity characteristics, the weight average molecular weight Mwg of the side chain, the weight average molecular weight Mwa of the whole polymer, the number average molecular weight Mna of the whole polymer, the ratio Mwa/Mwg of the weight average molecular weight of the whole polymer to the weight average molecular weight of the side chain and the polydispersity Mwa/Mna were measured in the same manner as in EXAMPLE 1. As a result, the results shown in the following Table were obtained. In the following Table, those whose solubility was at most 3% are indicated by "O", and those whose solubility exceeded 3% are indicated by "X".

Pigment dispersions and pigment-dispersed inks were prepared in the same manner as in EXAMPLE 1 except that the respective graft polymers were used, and the resultant inks were evaluated. The results are shown in Table 1.

EXAMPLE 16

Graft Polymer G21 different in the acid value as shown in the following Table was obtained in the same manner as in the synthetic process of the graft polymer as described in EXAMPLE 2 except that the mass ratio MM:Sty:nBuA:HEA of the macromonomer (MM) to styrene (Sty) to n-butyl acrylate (nBuA) to 2-hydroxyethyl acrylate (HEA) was controlled to 35:37:19:9.

With respect to the graft polymer thus obtained, the acid value, the solubility, the viscosity characteristics, the weight average molecular weight Mwg of the side chain, the weight average molecular weight Mwa of the whole polymer, the number average molecular weight Mna of the whole polymer, the ratio Mwa/Mwg of the weight average molecular weight of the whole polymer to the weight average molecular weight of the side chain and the polydispersity Mwa/Mna were measured in the same manner as in EXAMPLE 1. As a result, the results shown in the following Table were obtained. In the following Table, those whose solubility was at most 3% are indicated by "O", and those whose solubility exceeded 3% are indicated by "X".

|        | Dispersing agent | Mwg  | Mwa  | Mna  | Mwa/Mwg | Mwa/Mna | Acid value (mg KOH/g) | Solubility | Viscosity characteristics |
|--------|------------------|------|------|------|---------|---------|-----------------------|------------|---------------------------|
| EX. 16 | G21              | 1000 | 5700 | 2300 | 5.7     | 2.5     | 270                   | O          | 1.40                      |

A pigment dispersion and a pigment-dispersed ink were prepared in the same manner as in EXAMPLE 1 except that the graft polymer obtained above was used, and the resultant ink was evaluated. The results are shown in Table 1.

EXAMPLES 17 TO 20

Macromonomers M21 to M24 were synthesized in the same manner as in the synthetic process of the macromonomer as described in EXAMPLE 2 except that acrylic acid (AA), 2-hydroxyethyl acrylate (HEA) and benzyl acrylate (BzA) were used in place of 80 parts of acrylic acid, and the mass ratio AA:HEA:BzA was controlled to 28:22:30 (EXAMPLE 17), 28:17:35 (EXAMPLE 18), 20:30:30 (EXAMPLE 19) and 20:20:40 (EXAMPLE 20). Graft Polymers G22 to G25 were then obtained in the same manner as in EXAMPLE 2 except that 30 parts of each of the respective macromonomers, 50 parts of benzyl acrylate and 20 parts of n-butyl acrylate were used.

Proportions of units having a hydrophilic group in the side chains of the graft polymers thus obtained were 63%, 56%,

|        | Dispersing agent | Mwg | Mwa  | Mna  | Mwa/Mwg | Mwa/Mna | Acid value (mg KOH/g) | Solubility | Viscosity characteristics |
|--------|------------------|-----|------|------|---------|---------|-----------------------|------------|---------------------------|
| EX. 14 | G19              | 980 | 5700 | 1900 | 6.0     | 3.0     | 110                   | O          | 1.38                      |
| EX. 15 | G20              | 990 | 6000 | 2600 | 5.8     | 2.3     | 58                    | O          | 1.35                      |

63% and 50%, respectively. Proportions of AA in the units having the hydrophilic group were 35%, 35%, 25% and 25%, respectively.

With respect to each of the graft polymers thus obtained, the acid value, the solubility, the viscosity characteristics, the weight average molecular weight Mwg of the side chain, the weight average molecular weight Mwa of the whole polymer, the number average molecular weight Mna of the whole polymer, the ratio Mwa/Mwg of the weight average molecular weight of the whole polymer to the weight average molecular weight of the side chain and the polydispersity Mwa/Mna were measured in the same manner as in EXAMPLE 1. As a result, the results shown in the following Table were obtained. In the following Table, those whose solubility was at most 3% are indicated by "O", and those whose solubility exceeded 3% are indicated by "X".

|  | Dispersing agent | Mwg | Mwa | Mna | Mwa/Mwg | Mwa/Mna | Acid value (mg KOH/g) | Solubility | Viscosity characteristics |
|---|---|---|---|---|---|---|---|---|---|
| EX. 17 | G22 | 1000 | 6200 | 3000 | 6.2 | 2.1 | 192 | O | 1.40 |
| EX. 18 | G23 | 780 | 7700 | 3000 | 9.9 | 2.6 | 197 | O | 1.30 |
| EX. 19 | G24 | 620 | 11000 | 3100 | 17.7 | 3.5 | 216 | O | 1.25 |
| EX. 20 | G25 | 620 | 13800 | 4000 | 22.5 | 3.5 | 213 | O | 1.30 |

Pigment dispersions and pigment-dispersed inks were prepared in the same manner as in EXAMPLE 1 except that the respective graft polymers were used, and the resultant inks were evaluated. The results are shown in Table 1.

TABLE 1

|  | Ejection stability | Storage stability | Coloring ability |
|---|---|---|---|
| EX. 1 | A | A | 52 |
| EX. 2 | AA | A | 53 |
| EX. 3 | AA | A | 54 |
| EX. 4 | AA | A | 54 |
| EX. 5 | A | A | 53 |
| EX. 6 | A | A | 52 |
| EX. 7 | AA | A | 53 |
| EX. 8 | A | A | 53 |
| EX. 9 | A | A | 52 |
| EX. 10 | A | A | 52 |
| EX. 11 | A | A | 52 |
| EX. 12 | A | A | 53 |
| EX. 13 | A | A | 53 |
| EX. 14 | AA | A | 54 |
| EX. 15 | A | A | 54 |
| EX. 16 | AA | A | 54 |
| EX. 17 | A | A | 53 |
| EX. 18 | A | A | 53 |
| EX. 19 | A | A | 53 |
| EX. 20 | A | A | 53 |
| COMP. EX. 1 | B | B | 49 |
| COMP. EX. 2 | C | C | 48 |
| COMP. EX. 3 | C | B | 48 |
| COMP. EX. 4 | C | C | 48 |
| COMP. EX. 5 | B | C | 49 |

EXAMPLE 21

(Synthesis of Vinyl Copolymer A1)

Forty parts of styrene, 40 parts of butyl methacrylate and 20 parts of methacrylic acid were used to conduct radical polymerization using azobisisobutyronitrile in 500 parts of 2-propanol at a polymerization temperature of 75° C. while adding the reactants dropwise over 3 hours under a nitrogen atmosphere. After the drop addition, the temperature of the reaction system was kept at 75° C. for 2 hours, and the reaction product thus obtained was then developed in 1,000 parts of hexane to remove unreacted compounds by precipitation purification, and dried under reduced pressure to obtain Vinyl Copolymer A1.

This Vinyl Copolymer A1 had a weight average molecular weight of 10,000, a number average molecular weight of 4,200, a polydispersity of 2.4 and an acid value of 55 mg KOH/g. One part of Vinyl Copolymer A1 obtained above was mixed with 33 parts of an aqueous solution of KOH with 0.083 parts of KOH dissolved therein (to prepare a 2.9% solution of the polymer), and the solution was stirred for 24 hours. Since the KOH solution was in a turbid state even after the stirring, and thus Vinyl Copolymer A1 was not dissolved, the solubility of the polymer was at most 3%.

(Preparation of Pigment Dispersion PK1)

The Vinyl Copolymer A1 obtained above was used, and propylene glycol monomethyl ether that dissolves Copolymer A1 therein was added to a dispersion medium to dissolve Vinyl Copolymer A1.

| Vinyl Copolymer A1 | 8 parts |
|---|---|
| Propylene glycol monomethyl ether | 50 parts |
| Ion-exchanged water | 200 parts |
| Ammonia | 1 part. |

Namely, the above components were mixed with one another to dissolve Vinyl Copolymer A1. Thirty parts of carbon black (Color Black FW18, trade name, product of Degussa) were added to premix the components for 30 minutes. Thereafter, the resultant premix was subjected to a dispersing treatment under the following conditions.

Dispersing machine: sand grinder (manufactured by Igarashi Kikai K. K.)

Grinding medium: zirconium beads (diameter: 1 mm)

Packing rate of grinding medium: 75% (by volume)

Grinding time: 3 hours.

A centrifugal treatment (centrifugal effect: 2,100 G, for 60 minutes) was then conducted to remove coarse particles, and an additional centrifugal treatment (centrifugal effect: 20,000 G, for 3 hours) was conducted to separate solids from the solvents. A 1% aqueous solution of KOH was added to the solids obtained by separation so as to give a solid concentration of 15% to prepare Pigment Dispersion PK1.

(Preparation of Ink K1)

The following components including the Pigment Dispersion PK1 obtained above were mixed, and the mixture was then filtered to prepare a black Ink K1.

| Pigment Dispersion PK1 | 30 parts |
|---|---|
| Glycerol | 5 parts |
| Diethylene glycol | 5 parts |
| Isopropyl alcohol | 5 parts |
| Acetylenol EH (trade name, product of Kawaken Fine Chemicals Co., Ltd.) | 1 part |
| Ion-exchanged water | 54 parts. |

(Ink C1)

A pigment-containing cyan Ink C1 was prepared in the same manner as in the preparation of Ink K1 except that 30 parts of carbon black (Color Black FW18, trade name, product of Degussa) used in the preparation of Pigment Dispersion PK1 were changed to Pigment Blue 15:3 to prepare Pigment Dispersion PC2, and this dispersion was used.

(Ink M1)

A pigment-containing magenta Ink M1 was prepared in the same manner as in the preparation of Ink K1 except that 30 parts of carbon black (Color Black FW18, trade name, product of Degussa) used in the preparation of Pigment Dispersion PK1 were changed to Pigment Red 122 to prepare Pigment Dispersion PM1, and this dispersion was used.

(Ink Y1)

A pigment-containing yellow Ink Y1 was prepared in the same manner as in the preparation of Ink K1 except that 30 parts of carbon black (Color Black FW18, trade name, product of Degussa) used in the preparation of Pigment Dispersion PK1 were changed to Pigment Yellow 74 to prepare Pigment Dispersion PY1, and this dispersion was used.

(Preparation of Ink Set I)

Ink Set I comprising Inks K1, C1, M1 and Y1 obtained in the above-described manner, in which the respective pigments were dispersed by the same resinous dispersing agent (Vinyl Copolymer A1), was provided.

(Evaluation)

The Ink Set I obtained above was evaluated in the same manner as in EXAMPLE 1 except for coloring ability. The results are shown in Table 2.

TABLE 2

Evaluation of properties of respective inks in Ink Set I and viscosity characteristics

| Color pigment ink | Ejection stability | Storage stability | Shear rate (0.5 s$^{-1}$) | Shear rate (100 s$^{-1}$) | Viscosity ratio |
|---|---|---|---|---|---|
| K1 | A | A | 2.8 | 2.5 | 1.12 |
| C1 | AA | A | 3.2 | 2.3 | 1.39 |
| M1 | A | A | 2.6 | 2.2 | 1.18 |
| Y1 | A | A | 2.7 | 2.3 | 1.17 |

EXAMPLE 22

In this example, Ink Set II composed of a combination of inks, in which the resinous dispersing agent was optimized according to the kind of the pigment, was used. As a result, the ejection property was able to be improved compared with the case of EXAMPLE 21. Vinyl Copolymer A2, Vinyl Copolymer A3 and Vinyl Copolymer A4, which were used as resinous dispersing agents, were first synthesized in the following manner.

(Synthesis of Vinyl Copolymer A2)

Vinyl Copolymer A2 was synthesized in the same manner as in EXAMPLE 21 except that 40 parts of styrene, 20 parts of NK Ester M-40G (trade name, product of Shin-Nakamura Chemical Co., Ltd.) and 40 parts of methacrylic acid were used.

Vinyl Copolymer A2 thus obtained had a weight average molecular weight of 9,600, a number average molecular weight of 6,000, a polydispersity of 1.6 and an acid value of 208 mg KOH/g. One part of Vinyl Copolymer A2 obtained above was mixed with 33 parts of an aqueous solution of KOH with 0.32 parts of KOH dissolved therein, and the solution was stirred for 24 hours. However, the KOH solution was in a turbid state, and thus Vinyl Copolymer A2 was not dissolved.

(Synthesis of Vinyl Copolymer A3)

Vinyl Copolymer A3 was synthesized in the same manner as in EXAMPLE 21 except that 40 parts of benzyl methacrylate, 20 parts of n-butyl methacrylate and 40 parts of methacrylic acid were used.

Vinyl Copolymer A3 thus obtained had a weight average molecular weight of 10,500, a number average molecular weight of 6,200, a polydispersity of 1.7 and an acid value of 222 mg KOH/g. One part of Vinyl Copolymer A2 obtained above was mixed with 33 parts of an aqueous solution of KOH with 0.32 parts of KOH dissolved therein, and the solution was stirred for 24 hours. However, the KOH solution was in a turbid state, and thus Vinyl Copolymer A3 was not dissolved.

(Synthesis of Vinyl Copolymer A4)

Vinyl Copolymer A4 was synthesized in the same manner as in EXAMPLE 21 except that 40 parts of benzyl methacrylate, 20 parts of NK Ester M-40G (trade name, product of Shin-Nakamura Chemical Co., Ltd.) and 40 parts of methacrylic acid were used.

Vinyl Copolymer A4 thus obtained had a weight average molecular weight of 10,500, a number average molecular weight of 6,500, a polydispersity of 1.6 and an acid value of 232 mg KOH/g. One part of Vinyl Copolymer A4 obtained above was mixed with 33 parts of an aqueous solution of KOH with 0.35 parts of KOH dissolved therein, and the solution was stirred for 24 hours. However, the KOH solution was in a turbid state, and thus Vinyl Copolymer A4 was not dissolved.

(Preparation of Pigment Dispersion PK2)

Pigment Dispersion PK2 was prepared in the same manner as in the preparation of Pigment Dispersion PK1 in EXAMPLE 21 except that Vinyl Copolymer A1 used in the preparation of Pigment Dispersion PK1 in EXAMPLE 21 was changed to Vinyl Copolymer A2 obtained above, and carbon black (Color Black FW18, trade name, product of Degussa) was changed to MCF 88 (trade name, product of Mitsubishi Chemical Industries Limited).

(Preparation of Pigment Dispersion PM2)

Pigment Dispersion PM2 was prepared in the same manner as in the preparation of Pigment Dispersion PM1 in EXAMPLE 21 except that Vinyl Copolymer A1 used in the preparation of Pigment Dispersion PM1 in EXAMPLE 21 was changed to Vinyl Copolymer A3 obtained above.

(Preparation of Pigment Dispersion PY2)

Pigment Dispersion PY2 was prepared in the same manner as in the preparation of Pigment Dispersion PY1 in EXAMPLE 21 except that Vinyl Copolymer A1 used in the preparation of Pigment Dispersion PY1 in EXAMPLE 21 was changed to Vinyl Copolymer A4 obtained above.

(Preparation of Ink K2)

Ink K2 was prepared in the same manner as in the preparation of Ink K1 in EXAMPLE 21 except that Pigment Dispersion PK1 was changed to Pigment Dispersion PK2 obtained above.

(Preparation of Ink M2)

Ink M2 was prepared in the same manner as in the preparation of Ink M1 in EXAMPLE 21 except that Pigment Dispersion PM1 was changed to Pigment Dispersion PM2 obtained above.

(Preparation of Ink Y2)

Ink Y2 was prepared in the same manner as in the preparation of Ink Y1 in EXAMPLE 21 except that Pigment Dispersion PY1 was changed to Pigment Dispersion PY2 obtained above.

(Preparation of Ink Set II)

Ink Set II comprising Inks K2, M2 and Y2 obtained in the above-described manner, in which the respective pigments were dispersed by the different resinous dispersing agents (Vinyl Copolymers A2, A3 and A4), was provided.

[Evaluation]

Ink Set II obtained above was used to evaluate the respective inks as to the ejection stability and storage stability in the same manner as in EXAMPLE 21. The results are shown collectively in Table 4. The measured results of the storage test are shown in Table 3. The viscosities of the respective inks were measured in the same manner as in EXAMPLE 21, and the measured results are shown in Table 4. The resinous dispersing agent was optimized according to the kind of the pigment, whereby the viscosity ratios of the respective Inks K2, M2 and Y2 making up Ink Set II became higher compared with the case of EXAMPLE 21 as shown in Table 4. In this example using such Ink Set II, it was found that in particular, the ejection stability can be more improved compared with the case of EXAMPLE 21 (see Table 4).

TABLE 3

Change in average particle diameter before and after storage test

| | K2 | M2 | Y2 |
|---|---|---|---|
| Average particle diameter (nm) | | | |
| Before storage test | 113 | 128 | 157 |
| After storage test | 118 | 132 | 163 |
| Rate of change of particle diameter (%) | 4.4 | 3.1 | 3.8 |

TABLE 4

Evaluation of properties of respective inks in Ink Set II and viscosity characteristics

| | | | Viscosity (mPa · s) | | |
|---|---|---|---|---|---|
| Color pigment ink | Ejection stability | Storage stability | Shear rate (0.5 s$^{-1}$) | Shear rate (100 s$^{-1}$) | Viscosity ratio |
| K2 | AA | A | 3.5 | 2.5 | 1.40 |
| M1 | AA | A | 3.2 | 2.6 | 1.23 |
| Y1 | AA | A | 3.2 | 2.4 | 1.33 |

EXAMPLE 23

In this example, Ink set I used in EXAMPLE 21 and Reactive Liquid S1 prepared in the following manner were combined with each other to provide Ink Set III. As described below, it was found that the printing characteristics of a recorded article on a recording medium by the respective inks are improved by providing Ink Set III using Reactive Liquid S1 in combination. This ink set will hereinafter be described.

(Preparation of Reactive Liquid S1)

The following components were mixed, and the resultant mixture was then filtered to prepare Reactive Liquid S1.

| | |
|---|---|
| Diethylene glycol | 10.0 parts |
| Methyl alcohol | 5.0 parts |
| Magnesium nitrate | 3.0 parts |
| Acetylenol EH (trade name, product of Kawaken Fine Chemicals Co., Ltd.) | 0.5 parts |
| Ion-exchanged water | 81.5 parts. |

The surface tensions of Reactive Liquid S1 obtained above and the respective inks of K1, C1, M1 and Y1 making up Ink Set I were measured and found to be as shown in Table 5.

TABLE 5

Surface tensions of inks and the like in Ink Set III

| | Surface tension (mN/m) |
|---|---|
| Color Pigment Ink K1 | 38 |
| Color Pigment Ink C1 | 36 |
| Color Pigment Ink M1 | 38 |
| Color Pigment Ink Y1 | 35 |
| Reactive Liquid S1 | 40 |

Ink Set III comprising Reactive Liquid S1 and Inks K1, C1, M1 and Y1 used in EXAMPLE 21 was used to form an image on PB paper (product of Canon Inc.), which is plain paper, in the following manner, thereby conducting a printing test.

In printing, Reactive Liquid S1 was first applied, and Inks K1, C1, M1 and Y1 were then applied so as to come into contact with the applied Reactive Liquid S1 to produce a print. A recording head used in the formation of the image had a recording density of 1,200 dpi, and it was driven under conditions of a drive frequency of 15 kHz. The head used was such that an ejection volume per dot is 4 pl. Environmental conditions upon the printing test were unified to 25° C./55% RH.

The print obtained in the above-described manner had good resistance to bleeding, and no bleeding occurred between the respective inks of different colors. The optical density of K1 and chromas of C1, M1 and Y1 in the printed portion were measured by means of a reflective densitometer RD-191 (trade name, manufactured by Gretag Macbeth). As a result, the optical density of Ink K1 was 1.3, and the chromas of C1, M1 and Y1 were 52, 61 and 74, respectively. From these results, it was able to be confirmed that the use of Ink Set III can provide a print high in both image density and chroma.

EXAMPLE 24

In this example, Reactive Liquid S2 prepared in the following manner was combined in place of Reactive Liquid S1 used in EXAMPLE 23 to provide Ink Set IV. The surface tension of Reactive Liquid S2 used in this example was 58 mN/m. Since this Reactive Liquid S2 was used in combination in place of Reactive Liquid S1 (surface tension: 40 mN/m) used in EXAMPLE 23 in this example, a difference in surface tension between the reactive liquid and the ink is great compared with Ink Set III in EXAMPLE 23. As a result, as described below, it was found that when an image is formed, the printing characteristics of a recorded article on a recording medium can be improved compared with the case where Ink Set III in EXAMPLE 23 was used.

(Preparation of Reactive Liquid S2)

The following components were mixed, and the resultant mixture was then filtered to prepare Reactive Liquid S2. The surface tension of Reactive Liquid S2 thus obtained was 58 mN/m.

| | |
|---|---|
| Diethylene glycol | 10.0 parts |
| Methyl alcohol | 5.0 parts |
| Magnesium nitrate | 3.0 parts |
| Acetylenol EH (trade name, product of Kawaken Fine Chemicals Co., Ltd.) | 0.1 parts |
| Ion-exchanged water | 81.9 parts. |

Ink Set IV comprising Reactive Liquid S2 and Inks K1, C1, M1 and Y1 used in EXAMPLE 21 was used to form an image on PB paper (product of Canon Inc.), which is plain paper, thereby conducting a printing test. In the formation of the image, Reactive Liquid S2 was first applied, and Inks K1, C1, M1 and Y1 were then applied so as to come into contact with the applied Reactive Liquid S2 to produce a print. At this time, printing conditions and the like were the same as in EXAMPLE 23.

As a result of the printing test, the print produced had good resistance to bleeding, and no bleeding occurred between the respective inks of different colors. As with the case of EXAMPLE 23, the optical density of K1 and chromas of C1, M1 and Y1 in the printed portion were measured by means of a reflective densitometer RD-191 (trade name, manufactured by Gretag Macbeth). As a result, the optical density of Ink K1 was 1.6, and the chromas of C1, M1 and Y1 were 55, 67 and 80, respectively. From the result of comparison with the reflective density of the print obtained in EXAMPLE 23, it was confirmed that the image density of the recorded article on the recording medium is improved by greatly raising the surface tension of the reactive liquid used in combination with the inks compared with the surface tensions of the inks.

COMPARATIVE EXAMPLE 6

COMPARATIVE EXAMPLE 6 is an example where a pigment is dispersed with a resin soluble in an alkaline solution containing KOH in an amount less than 1.5 times as much as the acid value of the resin.

(Synthesis of Vinyl Copolymer A5).

Vinyl Copolymer A5 was first synthesized in the same manner as in EXAMPLE 21 except that 60 parts of styrene and 40 parts of acrylic acid were used. This Vinyl Copolymer A5 had a weight average molecular weight of 9,400, a number average molecular weight of 4,000, a polydispersity of 2.4 and an acid value of 201 mg KOH/g. One part of Vinyl Copolymer A5 obtained above was mixed with 19 parts of an aqueous solution of KOH with 0.3 parts of KOH dissolved therein (a 5% solution of the polymer), and the solution was stirred for 24 hours. As a result, the KOH solution turned transparent, and thus Vinyl Copolymer A5 was dissolved.

(Preparation of Pigment Dispersion PK3)

Pigment Dispersion PK3 was prepared in the same manner as in the preparation of Pigment Dispersion PK1 in EXAMPLE 21 except that Vinyl Copolymer A1 used in the preparation of Pigment Dispersion PK1 in EXAMPLE 21 was changed to Vinyl Copolymer A5 obtained above, and carbon black (Color Black FW18, trade name, product of Degussa) was changed to MCF 88 (trade name, product of Mitsubishi Chemical Industries Limited).

(Preparation of Ink K3)

Ink K3 was prepared in the same manner as in the preparation of Ink K1 in EXAMPLE 21 except that Pigment Dispersion PK1 was changed to Pigment Dispersion PK3 obtained above. With respect to the black Ink K3 thus obtained, the ejection stability and storage stability of the ink K3 were evaluated in the same manner as in EXAMPLE 21. The results are shown collectively in Table 7. The measured results of the storage test are shown in Table 6. The viscosity of Ink K3 was measured in the same manner as in EXAMPLE 1, and the measured results are shown in Table 7.

TABLE 6

Change in average particle diameter before and after storage test

| | | K3 |
|---|---|---|
| Average particle diameter (nm) | Before storage test | 110 |
| | After storage test | 135 |
| Rate of change of particle diameter (%) | | 22.7 |

TABLE 7

Evaluation of properties of Ink K3 and viscosity characteristics

| | | | Viscosity (mPa · s) | | |
|---|---|---|---|---|---|
| Color pigment ink | Ejection stability | Storage stability | Shear rate (0.5 s$^{-1}$) | Shear rate (100 s$^{-1}$) | Viscosity ratio |
| K3 | C | B | 2.6 | 2.5 | 1.04 |

As with EXAMPLE 21, correlation between the viscosity ratio obtained above and the ejection stability and storage stability of Ink K3 was considered. As a result, as shown in Table 7, the viscosity ratio of Ink K3 between the shear rate of 0.5 s$^{-1}$ and the shear rate of 100 s$^{-1}$ is smaller than 1.1, the ejection stability thereof was poor, and the storage stability was not good. In addition, the image quality of the recorded article was poor.

COMPARATIVE EXAMPLE 7

In this example, a nonionic surfactant was added for the purpose of improving the ejection stability of Ink K3.

(Preparation of Ink K4)

The following components including the Pigment Dispersion PK3 obtained in COMPARATIVE EXAMPLE 6 were mixed, and the mixture was then filtered to prepare a black Ink K4.

| | |
|---|---|
| Pigment Dispersion PK3 | 30 parts |
| Glycerol | 5 parts |
| Diethylene glycol | 5 parts |
| Isopropyl alcohol | 5 parts |
| BC-20TX (trade name, product of Nikko Chemicals Co., Ltd.) | 1 part |
| Ion-exchanged water | 54 parts. |

With respect to the Ink K4 thus obtained, the ejection stability and storage stability of the Ink K4 were evaluated in the same manner as in EXAMPLE 21. The results are shown collectively in Table 9. The measured results of the storage test are shown in Table 8. The viscosity of Ink K4 was measured in the same manner as in EXAMPLE 1, and the measured results are shown in Table 9. Reactive Liquid S1 used in EXAMPLE 23 and Inks K4 obtained above were used to form an image on PB paper (product of Canon Inc.), which is plain paper, thereby conducting a printing test. At this time, Reactive Liquid S1 was first applied, and Ink K4 was then applied so as to come into contact with the applied Reactive Liquid S1 to produce a print. The reflection density of a printed portion in the print thus obtained was as shown in Table 9.

TABLE 8

Change in average particle diameter before and after storage test

| | | K4 |
|---|---|---|
| Average particle diameter (nm) | Before storage test | 120 |
| | After storage test | 152 |
| Rate of change of particle diameter (%) | | 26.6 |

TABLE 9

Evaluation of properties of Ink K4, viscosity characteristics and reflective density

| | | | Viscosity (mPa · s) | | | |
|---|---|---|---|---|---|---|
| Color pigment ink | Ejection stability | Storage stability | Shear rate (0.5 s$^{-1}$) | Shear rate (100 s$^{-1}$) | Viscosity ratio | Reflective density |
| K4 | B | B | 4.2 | 2.5 | 1.68 | 1.04 |

As shown in Table 9, the ink K4 in this comparative example was observed improving the ejection stability compared with Ink K3 of COMPARATIVE EXAMPLE 6. However, as the result of the printing test, it is not said to be satisfactory from the viewpoint of image quality. The storage stability also remained not very good. In addition, even when Reactive Liquid S1 was used in combination, the recorded article on the recording medium was not observed improving the reflective density.

The present invention has effects that the recorded article formed on the recording medium exhibits good weather fastness by using the pigment-dispersed inks or ink set according to the present invention, the ejection stability and storage stability of the inks are surely retained, the recorded article is prevented from being disordered by lowering of the impact accuracy, and images free of image disorder and excellent in weather fastness can be provided. In addition, when the reactive ink set according to the present invention is used, the recorded article on the recording medium can surely retain sufficient coloring, and good images having a high reflective density can be provided. According to the present invention, there can be provided the production process, by which the above-described pigment-dispersed inks having the excellent effects described above are simply provided.

This application claims priority from Japanese Patent Application No. 2003-347808 filed Oct. 7, 2003, which is hereby incorporated by reference herein.

What is claimed is:

1. A pigment-dispersed ink-jet ink comprising water, a water-soluble organic solvent, a pigment, and a resinous dispersing agent,
    wherein the resinous dispersing agent is a vinyl copolymer having an acid value of 50 mg KOH/g or higher and a solubility of at most 3% by mass in an alkaline solution containing KOH in an amount 1.5 times as much as the acid value, and a viscosity characteristic of the ink as measured by means of a viscoelastometer satisfies the following relationship:

$1.1 \leq$ (Viscosity of an ink as measured under conditions of 20° C. and a shear rate of 0.5 sec$^{-1}$)/(Viscosity of an ink as measured under conditions of 20° C. and a shear rate of 100 sec$^{-1}$) $\leq 2.0$.

wherein the resinous dispersing agent is a graft polymer having a hydrophobic main chain and a hydrophilic side chain, in which the weight average molecular weight of the side chain is 300 to 2,000, and the weight average molecular weight of the graft polymer itself and the weight average molecular weight of the side chain satisfy the following relationship:

$4 \leq$ (Weight average molecular weight of the graft polymer itself)/(Weight average molecular weight of the side chain of the graft polymer) $\leq 20$, and wherein the proportion of hydrophobic monomers making up the main chain is 60% by mass or higher based on the mass of all monomers forming the main chain.

2. The pigment-dispersed ink-jet ink according to claim 1, wherein the resinous dispersing agent is a vinyl copolymer having an acid value of 200 mg KOH/g or higher.

3. The pigment-dispersed ink-jet ink according to claim 1, wherein the resinous dispersing agent is a vinyl copolymer having an acid value that satisfies the following relationship:

50 mg KOH/g $\leq$ acid value $\leq$ 300 mg KOH/g.

4. The pigment-dispersed ink-jet ink according to claim 1, wherein the weight average molecular weight of the graft polymer is 1,000 to 30,000.

5. The pigment-dispersed ink-jet ink according to claim 1, wherein the proportion of hydrophilic monomers making up the side chain is 60% by mass or higher based on the mass of all monomers forming the side chain.

6. The pigment-dispersed ink-jet ink according to claim 1, wherein the proportion of monomers having a carboxyl group in the monomers making up the side chain is 30% by mass or higher based on the mass of all monomers forming the side chain.

7. A pigment-dispersed ink-jet ink comprising water, a water-soluble organic solvent, a pigment, and a resinous dispersing agent,
    wherein the resinous dispersing agent is a graft polymer having a hydrophobic main chain and a hydrophilic side chain, in which the weight average molecular weight of the side chain is 300 to 2,000, and the weight average molecular weight of the graft polymer itself and the weight average molecular weight of the side chain satisfy the following relationship:

$4 \leq$ (Weight average molecular weight of the graft polymer itself)/(Weight average molecular weight of the side chain of the graft polymer) $\leq 20$, wherein the proportion of hydrophobic monomers making up the main chain is 60% by mass or higher based on the mass of all monomers forming the main chain.

8. An ink set comprising a plurality of inks, wherein at least one of the inks is the ink according to claim 1 or 7.

9. The ink set according to claim 8, wherein the ink set comprises a reactive liquid containing a reactant reactive to a pigment-dispersed ink.

10. An ink tank comprising an ink-containing part which contains a pigment-dispersed ink-jet ink, wherein the ink is the ink according to claim 1 or 7.

11. A recording unit comprising a pigment-dispersed ink-jet ink and an ink-jet recording head for ejecting the ink, wherein the ink is the ink according to claim 1 or 7.

12. An ink-jet recording apparatus comprising a pigment-dispersed ink-jet ink and an ink-jet recording head for ejecting the ink, wherein the ink is the ink according to claim 1 or 7.

13. An ink-jet recording process comprising the step of ejecting a pigment-dispersed ink-jet ink on a recording medium by an ink-jet method, wherein the ink is the ink according to claim 1 or 7.

14. A process for producing the pigment-dispersed ink-jet ink according to claim 1 or 7, which comprises the step of adding a pigment into a hydrophilic medium containing an alkaline solution, which contains KOH in an amount 1 to 1.5 times as much as the acid value of the resinous dispersing agent contained in the ink, and the resinous dispersing agent.

15. The pigment-dispersed ink-jet ink according to claim 7, wherein the weight average molecular weight of the graft polymer is 1,000 to 30,000.

* * * * *

UNITED STATES PATENT AND TRADEMARK OFFICE
CERTIFICATE OF CORRECTION

PATENT NO.       : 7,378,459 B2
APPLICATION NO.  : 10/957611
DATED            : May 27, 2008
INVENTOR(S)      : Kenji Nishiguchi It is certified that error appears in the above-identified patent and that said Letters Patent is hereby corrected as shown below:

COLUMN 1
    Line 63, "and a" should read --and--.

COLUMN 10
    Line 4, "added-to" should read --added to--.

COLUMN 15
    Line 67, "630," should read --630,--.

COLUMN 25
    Line 7, "PC2," should read --PC1,--.

COLUMN 32
    Line 15, "2.0." should read --2.0,--.

Signed and Sealed this

Ninth Day of December, 2008

JON W. DUDAS
*Director of the United States Patent and Trademark Office*